US010915111B1

(12) United States Patent
Argenti et al.

(10) Patent No.: US 10,915,111 B1
(45) Date of Patent: Feb. 9, 2021

(54) ROADWAY SURFACE APPLIED ENCODED ROUTE INFORMATION

(71) Applicant: Amazon Technologies, Inc., Seattle, WA (US)

(72) Inventors: Marco Argenti, Mercer Island, WA (US); James Gosling, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 204 days.

(21) Appl. No.: 16/143,230

(22) Filed: Sep. 26, 2018

(51) Int. Cl.
| | |
|---|---|
| *G05D 1/02* | (2020.01) |
| *G05D 1/00* | (2006.01) |
| *G01C 21/28* | (2006.01) |
| *G01C 21/36* | (2006.01) |
| *G01C 21/34* | (2006.01) |
| *G01S 19/13* | (2010.01) |

(52) U.S. Cl.
CPC ........... *G05D 1/0234* (2013.01); *G01C 21/28* (2013.01); *G01C 21/3415* (2013.01); *G01C 21/36* (2013.01); *G01S 19/13* (2013.01); *G05D 1/0088* (2013.01)

(58) Field of Classification Search
CPC .... G05D 1/0234; G05D 1/0088; G01C 21/28; G01C 21/3415; G01C 21/36; G01S 19/13
See application file for complete search history.

(56) References Cited

U.S. PATENT DOCUMENTS

2018/0282955 A1\* 10/2018 McClendon .......... E01C 23/222

OTHER PUBLICATIONS

Chris Dales et al "Pavement Markings Guiding Autonomous Vehicles—A Real World Study" 2016, pp. 1-16.

\* cited by examiner

*Primary Examiner* — Michael D Lang
(74) *Attorney, Agent, or Firm* — Robert C. Kowert; Kowert, Hood, Munyon, Rankin & Goetzel, P.C.

(57) ABSTRACT

In some embodiments, route information and/or location identifiers are directly encoded on a surface of a roadway. A route information service stores detailed route information that correspond with sections of a roadway and provides instructions to a road symbol application device to apply combinations of shapes to a surface of the roadway to encode the route information and/or location identifiers on the roadway. A sensor of a vehicle traversing the roadway detects the combination of symbols, decodes the combination of symbols to determine route information and/or location identifiers, and provides the route information to a control system of the vehicle for use in controlling the vehicle or displays the route information via a display of the vehicle.

20 Claims, 19 Drawing Sheets

ROADWAY SURFACE APPLIED ENCODED ROUTE INFORMATION

BACKGROUND

Signage on roadways is typically designed to be read by human drivers and provides sparse information about the roadway. For example, road signs may provide information about speed limits or upcoming exits, but the information may be imprecise and spread out over long distances along the roadway. Also, more detailed information about the roadway such as road grade, road incline, road curvature, nearby amenities, etc. may not be included in road signage or may represent only a limited selection of amenities associated with a given section of a roadway. Moreover, the road signage may lack sufficiently detailed instructions to navigate to amenities associated with a given section of roadway.

Some autonomous, or semi-autonomous, vehicles may rely on roadway information included in electronic maps associated with a GPS system. However, such electronic maps may be inaccurate or incomplete. For example, when electronic maps are stored locally in a navigation system of an autonomous or semi-autonomous vehicle, the stored electronic map may not reflect current road conditions or may not include changes to roadways. Conversely, some navigation systems may rely on information from electronic maps stored remotely, such as in a network connected set of servers. However, in some areas, such as remote areas, network connections to the set of remote servers may be limited or unavailable, thus rendering such navigation systems inoperable. Additionally, in congested areas, the set of remote servers used in such navigation systems may not be able to timely service all requests for map information, thus rendering such navigation systems inoperable or may otherwise impair the operation of such systems.

Figure 1:
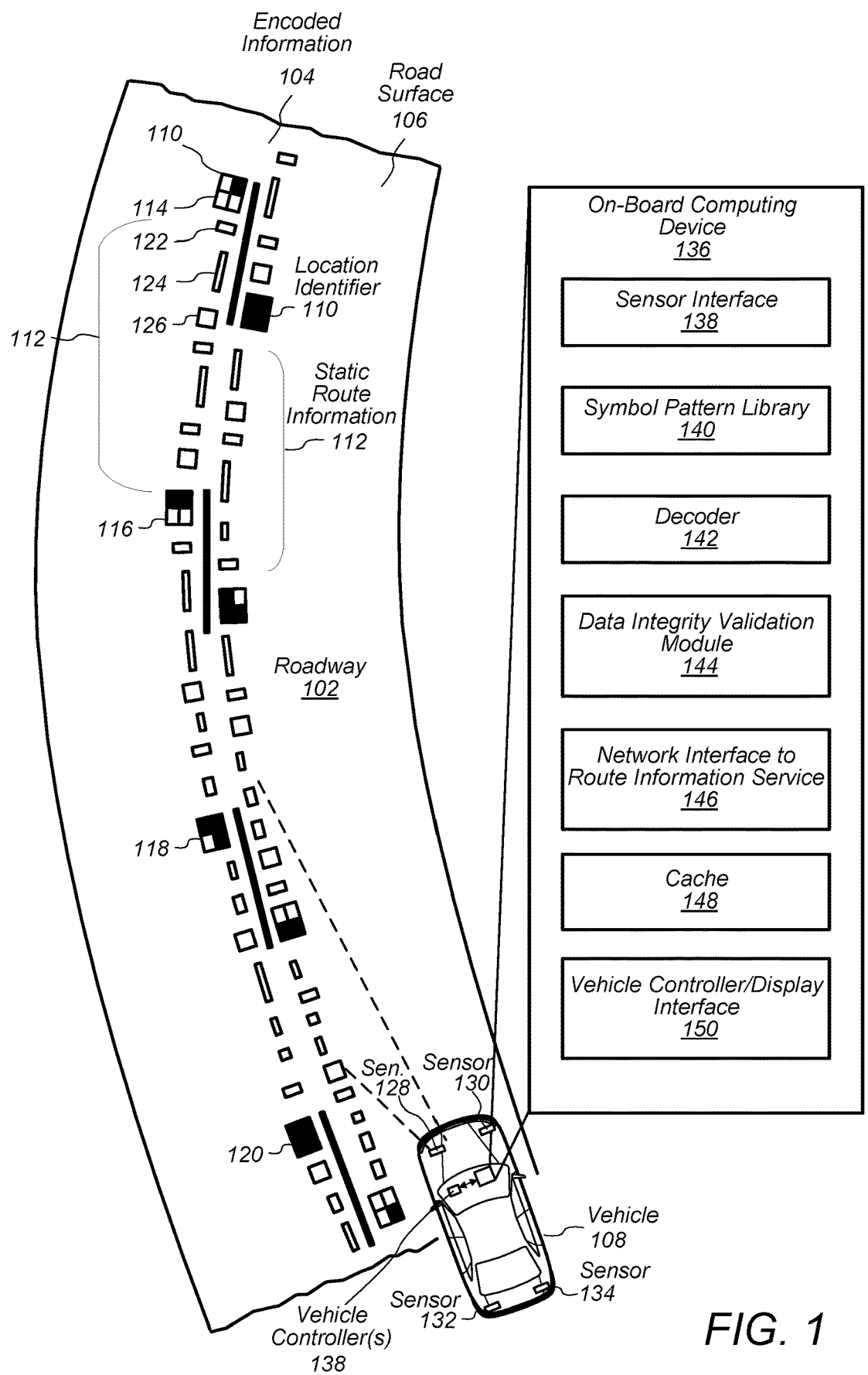
FIG. 1 illustrates a top view of a vehicle traversing a roadway that includes encoded information applied to a road surface of the roadway, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system to apply, read, or manage road surface applied encoded route information are described herein. In some embodiments, a system includes a sensor configured to mount on a vehicle and detect encoded information displayed on a road surface of a roadway as the vehicle travels along the roadway, wherein the encoded information is encoded via a combination of symbols displayed on the road surface of the roadway. The system also includes one or more computing devices configured to decode the encoded information comprising the combination of symbols detected by the sensor as the vehicle travels along the roadway and provide route information, determined based on the decoded information, to a control system of the vehicle or to a user of the vehicle. For example, the one or more computing devices may be on-board computer(s) mounted in the vehicle and the sensor may be one or more cameras mounted to the vehicle that face down towards the road surface either in front of, or behind, the vehicle. The cameras may capture images of the combination of symbols displayed on the surface of the road, and the on-board computer(s) may decode the encoded combination of symbols to determine route information for that section of the roadway, wherein the route information is then used for control of the vehicle or is displayed to a user of the vehicle, or both. In some embodiments, the combination of symbols displayed on the roadway may be combinations of shapes having different widths and lengths, such as squares or rectangles. In some embodiments, other shapes may be used. In some embodiments, the combination of symbols displayed on the road may be stripes and gaps, wherein a stripe represents a first digital state (e.g. a "1") and a gap represents another digital state (e.g. a "0"). In some embodiments to decode encoded information comprising stripes and gaps, a length of a stripe and a length of a gap may be used to decode the encoded information. For example, in some embodiments, a convention may be used, wherein each X feet of the roadway represents a digital slot. Thus, a 3X foot long strip may represent three consecutive "1's", and a 2X foot gap may represent two consecutive "0's", as an example. In some embodiments, various other symbol combinations or encoding conventions may be used.

In some embodiments, a system includes a road symbol application device comprising one or more computing devices, such as on-board computer(s), and a symbol applicator, such as a paint spray nozzle, a sticker applicator, a heat-based symbol applicator, or various other types of devices that are configured to affix a permanently embedded material to a surface of a roadway. The one or more computing devices of the road symbol application device are configured to send a current location along a roadway of the road symbol application device to one or more remote servers that implement a route information repository. The one or more computing devices of the road symbol application device are also configured to receive, from the one or more remote servers, route information associated with the current location of the road symbol application device. The symbol applicator of the road symbol application device is configured to apply an encoded combination of symbols to a surface of the roadway at the current location based on the route information associated with the current location received from the one or more remote servers that implement the route information repository.

In some embodiments, a method comprises receiving, by a route information service, a current location along a roadway of a road symbol application device, wherein the roadway is to be encoded by the road symbol application device using combinations of encoded symbols applied to a surface of the roadway by the road symbol application device. The method further includes providing the road symbol application device route information associated with the current location of the road symbol application device.

Often vehicles that rely on electronic maps for route information are susceptible to being provided incorrect route information and/or are susceptible to limited access to route information. For example, a GPS-type electronic map system may incorrectly detect a vehicle is on a certain road, when in reality the vehicle is actually on an adjacent road. Also, in dense areas large buildings or other obstructions may block a GPS signal. A similar phenomenon may occur in tunnels or other types of obstructed roadways. Additionally, in densely populated areas, network congestion, and/or a high volume of requests from other GPS-type electronic map based systems may impair a vehicle's ability to receive route information. Alternatively, GPS-type electronic maps that are stored locally in an on-board memory of a vehicle may quickly become outdated as new roads are added, modified, or repaired. Also, systems that utilize on-board stored GPS-type electronic maps may require access to a GPS signal to function properly and may be susceptible to interruptions in route information when a GPS signal is not available. Additionally, such systems may require near constant updates to stay up-to-date in regard to road modifications. Moreover, published electronic maps may not include route information for all roadways, such as roadways in remote areas, or roadways located on private property.

In some embodiments, in order to better provide access to route information and to ensure that route information corresponds to a correct roadway a vehicle is traversing, the route information may be directly encoded on a surface of a roadway. The route information may be encoded on the surface of the roadway using one or more combinations of symbols, such as shapes having varying lengths and/or widths or series of strips and gaps of different lengths, as some examples. The route information directly encoded on the surface of the roadway may be read by a sensor of a vehicle traversing the roadway and may be decoded by an on-board computer of the vehicle. Because the route information is encoded directly on the surface of the roadway being traversed by the vehicle, there may be no ambiguity as to whether or not the route information corresponds to the actual road the vehicle is traversing. Also, because the route information is encoded directly on the surface of the roadway being traversed by the vehicle, the vehicle may not be dependent on a network connection to provide the route information or may not be dependent on a remote-server to provide the route information.

However, in some embodiments, static route information encoded directly on a surface of a roadway may be supplemented with additional route information received from a route information service via a network connection to one or more remote computing devices implementing the route information service. For example, static route information encoded directly on a surface of a roadway may include a certain amount of route information for the roadway (also referred to herein as static route information) and a location identifier that allows an on-board computing device of the vehicle to request, from a route information service via a network connection, additional and/or dynamic route information for a particular section of the roadway the vehicle is traversing. In such embodiments, the location identifier directly encoded on the surface of the roadway being traversed by the vehicle may positively identify the correct roadway and location along that roadway where the vehicle is located without relying on a GPS signal.

Note that the term "roadway" as used herein should not be interpreted to being limited to any particular type of road, and may encompass various paths, roads, freeways, streets, railways, aisles, lanes etc. Also, in some embodiments a particular transit corridor may include multiple roadways. For example, in some embodiments, an interstate highway may include multiple lanes, wherein each lane is a separate "roadway" as the term is used herein. However, in some embodiments a "roadway" as used herein may refer to a single road comprising multiple lanes.

In some embodiments, a route information service may comprise a route information repository that includes geographical coordinates for sections of one or more roadways and route information associated with the respective sections. In some embodiments, the route information may be determined as part of the design and construction of the roadway and may be provided to the route information service. In some embodiments, the route information may be crowd-sourced from a plurality of users that traverse one or more roadways, wherein the users report GPS coordinates and observed route information at periodic intervals to the route information service. For example, a plurality of vehicles traversing a roadway may provide a route information service with current speeds of the vehicles and respective GPS coordinates of the vehicles when the speeds were measured. The route information service may perform one or statistical analysis on the crowd sourced route information to determine actual route information for one or more sections of the roadway. For example, with large sample sizes, the route information service may be able to accurately infer route information for respective sections of a roadway without having to physically measure or be provided the route information. For example, using a large sample of speed measurements a route information service may be able to perform statistical analysis on the speed measurements samples to determine a safe speed for a section of a roadway. Once the statistical analysis has been performed the resulting determined route information may be assigned to respective sections of the one or more roads corresponding to the route information. In some embodiments, a route information service may dynamically adjust route information and update route information assigned to respective sections of a roadway based on the dynamic adjustments. For example, a route information service may dynamically adjust a speed limit based on weather conditions, traffic conditions, or other factors.

In some embodiments, encoded information may be directly applied to other surfaces such as a ceiling of a facility, a ceiling of a tunnel or bridge, or other overhead surface. In such embodiments, a vehicle may similarly detect combinations of symbols displayed on the overhead surface and decode the combination of symbols to determine route information and/or a location identifier for a current section of the overhead structure beneath which the vehicle or device is travelling.

In some embodiments, various data security, data integrity, and/or data durability techniques may be used to ensure security, reliability, and/or durability of encoded information directly encoded on a surface of a roadway (or overhead structure). For example, in some embodiments, encoded information directly encoded on a surface of a roadway may be encrypted, such that a vehicle traversing the roadway upon which the encrypted encoded information is displayed may be required to possess an encryption key to determine route information from the encoded information.

In some embodiments, various data durability techniques may be used to ensure data durability, such as erasure encoding of encoded information directly encoded on a surface of a roadway (or overhead structure). In some embodiments, the encoded information directly encoded on a surface of a roadway may be redundantly encoded as a redundant array of independent symbols/stripes along the roadway. In some embodiments, other data durability techniques may be used.

In some embodiments, the encoded information directly encoded on a surface of a roadway may be encoded on the roadway as a set of linked entries. For example, location identifiers associated with different sections of a roadway may include labels (such as numbers) that are monotonically increasing. This may allow a vehicle traversing a roadway to determine a current location of the vehicle using less data than if the location identifiers were not linked. For example, a vehicle may read a location from a first location identifier displayed on a surface of a roadway and may infer a location of the vehicle from a second location identifier without having to read detailed location information from the second location identifier. For example, where location identifiers are spaced at one-mile intervals, a vehicle approaching a second location identifier may determine that it is a mile further down the road than the first location identifier by determining the second location identifier is the next location identifier in a linked sequence, without being required to read detailed location information from the second location identifier.

In some embodiments encoded information encoded directly on a surface of a roadway may be encoded using various compression techniques, such as arithmetic encoding, inter-frame compression (wherein at least some of the route information encoded on the roadway simply encodes differences from previous roadway sections without repeating the full set of route information for the subsequent roadway sections). In some embodiments, information encoded directly on a surface of a roadway may be encoded using a hash chain, as an example. In some embodiments, information encoded directly on a surface of a roadway may be signed using an authentication protocol.

FIG. 1 illustrates a top view of a vehicle traversing a roadway that includes encoded information applied to a road surface of the roadway, according to some embodiments.

Roadway 102 includes encoded information 104 encoded on road surface 106 on which vehicle 108 is traveling. The encoded information 104 includes location identifiers 110 and static route information 112 between respective ones of the location identifiers 110. In some embodiments, the location identifiers are labeled in a linked fashion such that the labels of the location identifiers are monotonically increasing numbers in a direction of vehicle travel along a roadway. For example, location identifier 114 has one colored in square and three non-colored in squares, whereas the next sequential location identifier, location identifier 116, in a direction of travel along the roadway 104 has two colored in squares and two non-colored in squares. In a similar manner, the next two sequential location identifiers in the direction of travel along the roadway 104, which are location identifiers 118 and 120, have three colored in squares and four colored in squares, respectively. As discussed in more detail in regard to FIG. 2, in some embodiments a colored in square of a location identifier may be colored in with more detailed location information. Because location identifiers are ordered in a linked list, once an on-board computing system of a vehicle determines a location associated with a first location identifier, the on-board computing system may infer locations associated with subsequent location identifiers based on the ordered linking between location identifiers. For example, in an embodiment where location identifiers are placed on the roadway at quarter mile intervals, each next sequential location identifier can be inferred to be located a quarter mile further down the roadway than the preceding location identifier.

In some embodiments, static route information encoded directly on a surface of a roadway, such as static route information 112, may include combinations of symbols that encode the static route information. In some embodiments, the combination of symbols may include shapes having different lengths and widths. For example, symbol 122 is a rectangle with a greater width than length. Symbol 124 is also a rectangle, but has a longer length than width. Symbol 126 is a square. Note that various other type of shapes or other symbols may be used to encode route information directly on a surface of a roadway. For example, in some embodiments, symbols having differing colors may be used to encode route information on a surface of a roadway. Also, other varying properties of a material embedded on a roadway surface may be used to encode route information, such as reflectance. In some embodiments, varying magnetic properties of a material embedded in a surface of a roadway may be used to encode route information.

In some embodiments, a vehicle, such as vehicle 108, may include one or more sensors, such as sensors 128, 130, 132, and 134. In some embodiments, sensor 128 is located on a front-left side of the vehicle 108 and has a view of approaching symbols displayed on an inside portion of a roadway along which vehicle 108 is traveling. In some embodiments, sensor 130 is located on a front-right side of the vehicle 108 and has a view of approaching symbols displayed on a shoulder or outside portion of a roadway along which vehicle 108 is travelling. In some embodiments, sensor 132 is located on a rear-left side of vehicle 108 and has a view of departing symbols displayed on an inside portion of a roadway along which vehicle 108 is traveling. In some embodiments, sensor 134 is located on a rear-right side of vehicle 108 and has a view of departing symbols displayed on a shoulder or outside portion of a roadway along which vehicle 108 is travelling.

In some embodiments, a vehicle, such as vehicle 108, may include one or more computing devices mounted on the vehicle, such as on-board computing device 136. In some embodiments, a vehicle may further include one or more vehicle controllers, such as vehicle controller 138. In some embodiments, vehicle controller 138 may be implemented as one or more modules running on on-board computing device 136. In some embodiments, sensors, such as sensors 128, 130, 132, and 134, may be cameras, LIDAR systems, infrared light detectors, magnetic detectors, or various other types of sensors configured to detect encoded information 104. The sensors may be connected to on-board computing device 136 of vehicle 108 such that information detected by the sensors 128, 130, 132, and/or 134 about information encoded on a surface of a roadway is communicated to the on-board computing device. For example, on-board computer device 136 may receive data detected by sensors 128, 130, 132, and 134.

In some embodiments, an on-board computing device may implement various software modules to implement a system to detect and decode route information encoded directly on a surface of a roadway. For example, on-board computing device 136 implements sensor interface 138, which is configured to receive sensed data from sensors 128, 130, 132, and 134. For example, sensor interface 138 may receive images captured by sensors 128, 130, 132, and 134, wherein the sensors are cameras. In some embodiments, an on-board computing device, such as on-board computing device 136, may store a symbol pattern library 140, wherein the symbol pattern library stores a directory of symbols and/or symbol combinations and related letters, numbers, words, phrases, etc. For example, encoded information 104 may include data indicating a curvature of a road using symbols and a symbol library may be used to convert a sensed combination of symbols back into a data format that can be used by a controller of a vehicle to make decisions based on the curvature of an upcoming curve. For example, in some embodiments, a decoder 142, may match detected symbols and/or symbol combinations with symbols or symbol combinations stored in symbol pattern library 140 to decode encoded information 104. In some embodiments, more advanced encoding techniques may be used to encode information into encoded information 104, such as compression techniques, encryption techniques, etc., and decoder 142 may decompress and/or decrypt the encoded information 104.

In some embodiments, an on-board computing device, such as on-board computing device 136, may implement a data integrity verification module, such as data integrity verification module 144. In some embodiments, a data integrity verification module may verify the integrity of encoded information 104 detected by sensors, such as sensors 128, 130, 132, and 134. For example, encoded information 104 may include a checksum value for each set of static route information 112, and data integrity validation module 144 may verify the checksum. In some embodiments, if a portion of encoded information 104 cannot pass a data integrity validation, a report may be issued for maintenance to be performed on the symbols displayed on the portion of the roadway 102 that failed the data integrity validation. In some embodiments, a signed signature may be encoded in encoded information 104, and data integrity validation module 144 may authenticate the encoded information 104 via the signature before allowing a controller of the vehicle to use route information decoded from the encoded information 104, for example to control the vehicle 108.

In some embodiments, an on-board computing device, such as on-board computing device 136, may include a network interface to a route information service, such as network interface 146. The network interface to the route information service may allow the on-board computing device to request additional and/or dynamic route information based on a location identifier, such as location identifiers 110. The network interface to the route information service 146 may also allow the on-board computing device 136 to report data integrity issues associated with information encoded directly on a surface of a roadway, such as encoded information 104.

In some embodiments, an on-board computing device 136 may request (or may be automatically provided) pre-fetched route information for future sections of a roadway the vehicle is likely to encounter. In some embodiments, the pre-fetched route information may be stored in a cache, such as cache 148.

In some embodiments, an on-board computing device 136 may include a vehicle controller/display interface 150. The vehicle controller/display interface 150 may provide an interface between the on-board computing device 136 and one or more other systems of the vehicle 108, such as vehicle controller 138, or one or more displays of the vehicle 108 (not shown).

For example, on-board computing device 136 may decode static information 112 to determine there is an upcoming curve in roadway 102 and may interact with vehicle controller 138 to cause the vehicle controller 138 to lower a speed of the vehicle 108 while traversing the upcoming curve. In another example, on-board computing device 136 may receive a request from vehicle controller 138 to locate an upcoming charging station. The on-board computing device 136 may decode static route information 112 to determine a location of an upcoming charging station and/or may request additional route information via network interface 146 to a route information service to determine an upcoming charging station location. The on-board computer 136 may then present one or more options to a user of vehicle 108 regarding upcoming charging stations via a display of vehicle 108 accessible to the user. In response to the user selecting one of the upcoming charging station options, the on-board computing device 136 may provide decoded route information to the vehicle controller 138 for navigating to the upcoming charging station, and the vehicle controller 138 may automatically navigate the vehicle 108 to the selected charging station.

Figure 2:
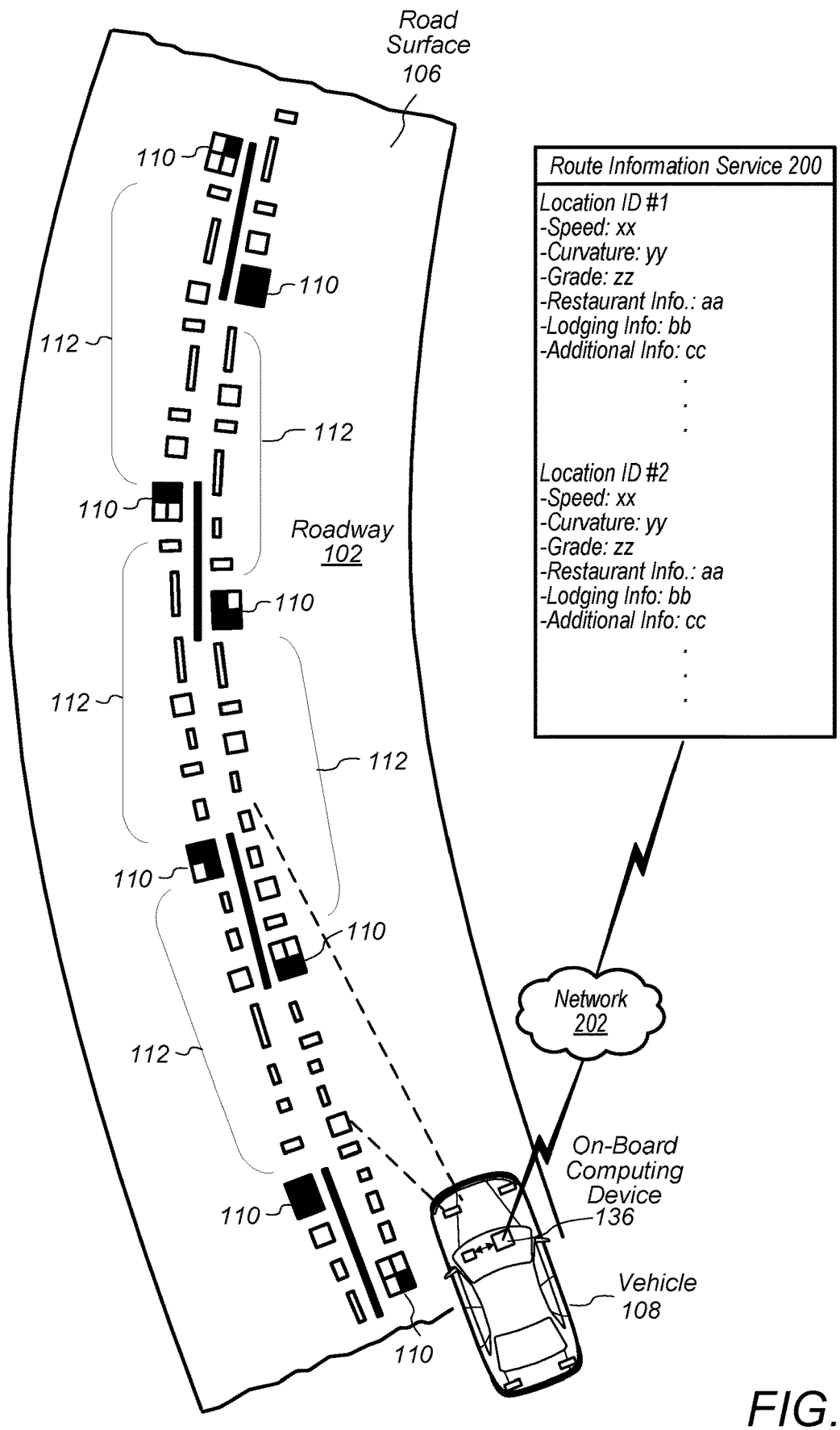
FIG. 2 illustrates a top view of a vehicle traversing a roadway that includes encoded information applied to a road surface of the roadway, wherein the encoded information includes location identifiers that can be used to fetch additional route information from a cloud repository, according to some embodiments.

FIG. 2 illustrates a top view of a vehicle traversing a roadway that includes encoded information applied to a road surface of the roadway, wherein the encoded information includes location identifiers that can be used to fetch additional route information from a cloud repository, according to some embodiments.

Roadway 102 and vehicle 108 illustrated in FIG. 2 may be the same as vehicle 108 and roadway 102 illustrated in FIG. 1. In FIG. 2, a network connection between the on-board computing device 136 and route information service 200 is illustrated. In some embodiments, a route information service, such as route information service 200 may be implemented on one or more computing devices connected to a plurality of vehicles via one or more networks, such as network 202. In some embodiments, a route information service may be implemented as a cloud service, and may be implemented on remote servers.

In some embodiments, a route information service, such as route information service 200, stores a table of location ID's that correspond with location identifiers encoded directly on a surface of a roadway and route information associated with each of the location identifiers. For example, speed, curvature, grade, restaurant information, lodging information, additional information, etc. is associated with each of location ID #1, and location ID #2. In some embodiments, a vehicle that has traversed over a location identifier, such as one of location identifiers 110, may provide a label associated with the location identifier to the route information service 200, and the route information service 200 may return additional and/or dynamic route information associated with the location identifier. Additionally, static route information 112 may be encoded directly on road surface 106 of roadway 102. The static route information 112 may provide a baseline amount of route information to allow vehicle 108 to safely traverse the section of road associated with the route information. For example, in some embodiments, static route information may include a "fail-safe" speed limit, whereas dynamic route information may provide a higher speed light that is dynamically adjusted based on current conditions, such as weather and traffic. If a connection to route information service 200 is not available vehicle 108 may proceed according to the fail-safe speed limit directly encoded in static route information 112, but if a connection to route information service 200 is available the vehicle may receive a higher dynamically adjusted speed limit from the route information service 200 and may proceed according to the higher speed limit, wherein route information service 200 monitors conditions for respective sections of roadway 102 associated with respective ones of location identifiers 110 to ensure the dynamic speed limit is a safe speed for current conditions.

Figure 3:
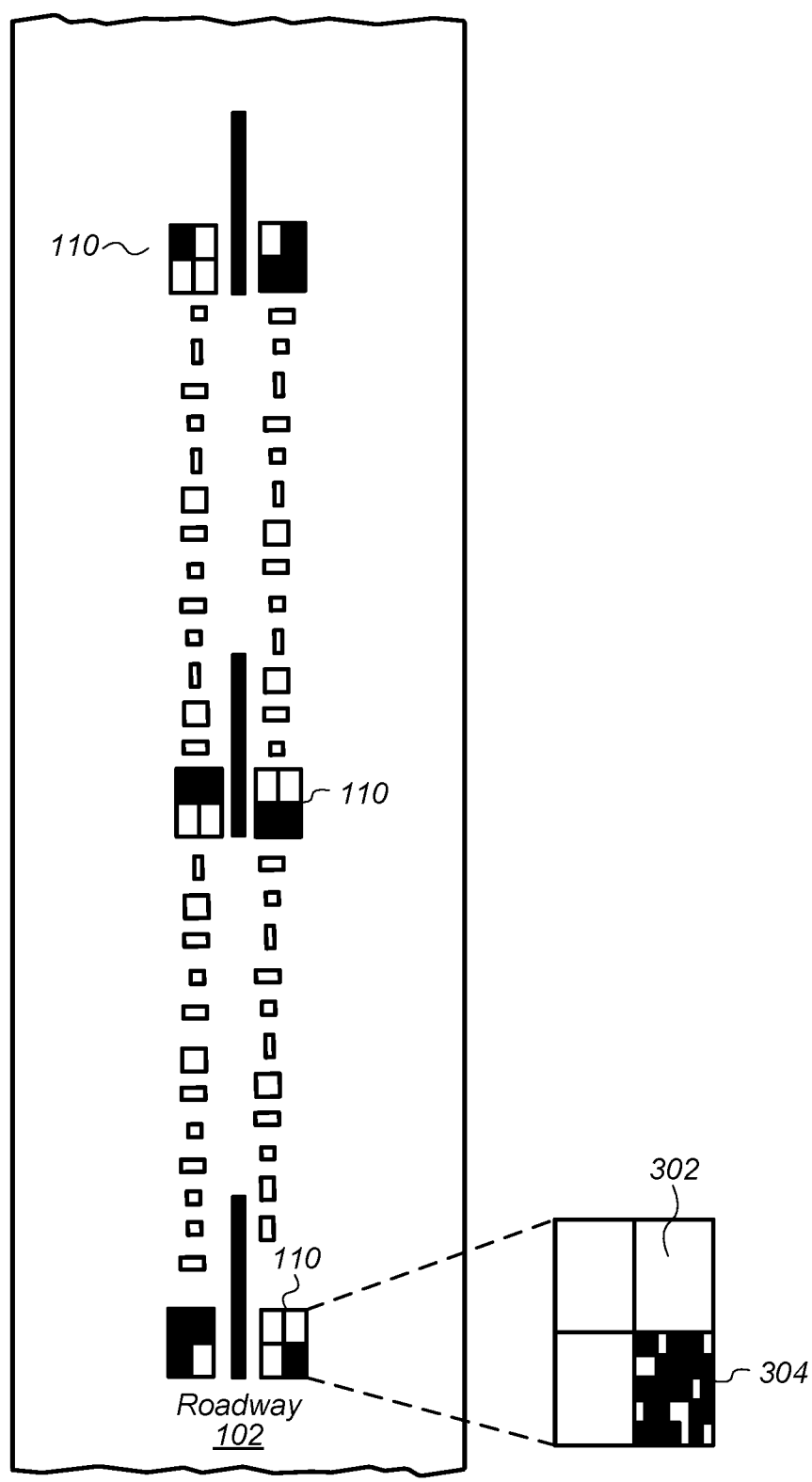
FIG. 3 illustrates an example configuration of encoded information displayed on a road surface of a roadway, according to some embodiments.

FIG. 3 illustrates an example configuration of encoded information displayed on a road surface of a roadway, according to some embodiments. In some embodiments, a location identifier 110 may include a set of non-colored boxes 302 in and colored-in boxes 304, wherein the number of colored-in boxes increases in a repeating sequence along the roadway in a direction of travel of a vehicle. In some embodiments, a colored-in box, such as colored-in box 304 may encode additional information about a location along roadway 102. For example, colored-in box 304 may include encoded data indicating lat., long. coordinates for a location of location identifier 110. In some embodiments, a colored-in box 304 may include encoded data indicating a location of the location identifier relative to other geographical references, such as an interstate, or a next nearest town. In some embodiments, a vehicle entering roadway 102, may initially read encoded data from a colored-in box 304 of an initial location identifier 110 that the vehicle encounters and may omit reading encoded information from subsequently encountered colored-in boxes of location identifiers. For example, after reading lat. long. coordinates from colored-in box 304, for a subsequent location identifier that is spaced at quarter mile intervals, the vehicle may simply add a quarter mile in the direction of the roadway 102 to the lat. long. coordinates read from the initial location identifier.

Figure 4:
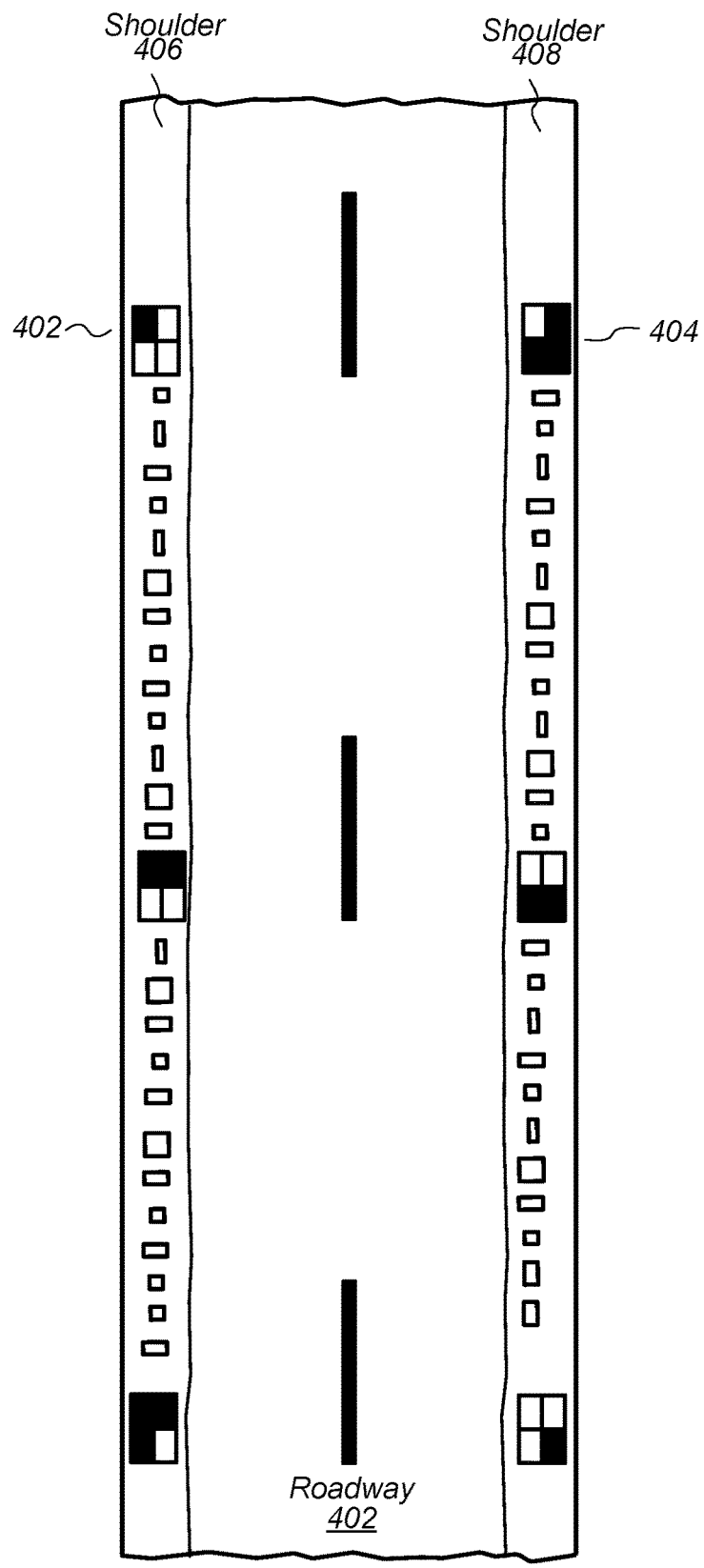
FIG. 4 illustrates an example configuration of encoded information displayed on a road surface of a roadway, according to some embodiments.

FIG. 4 illustrates an example configuration of encoded information displayed on a road surface of a roadway, according to some embodiments.

In some embodiments, encoded information encoded directly on a surface of a roadway may be encoded on a shoulder or outside portion of the roadway. For example, encoded information 402 and 404 is encoded on respective shoulders 406 and 408 of roadway 402. In some embodiments, the encoded information 402 and 404 may be similar to or the same as encoded information 104 described in regard to FIGS. 1-3.

Figure 5:
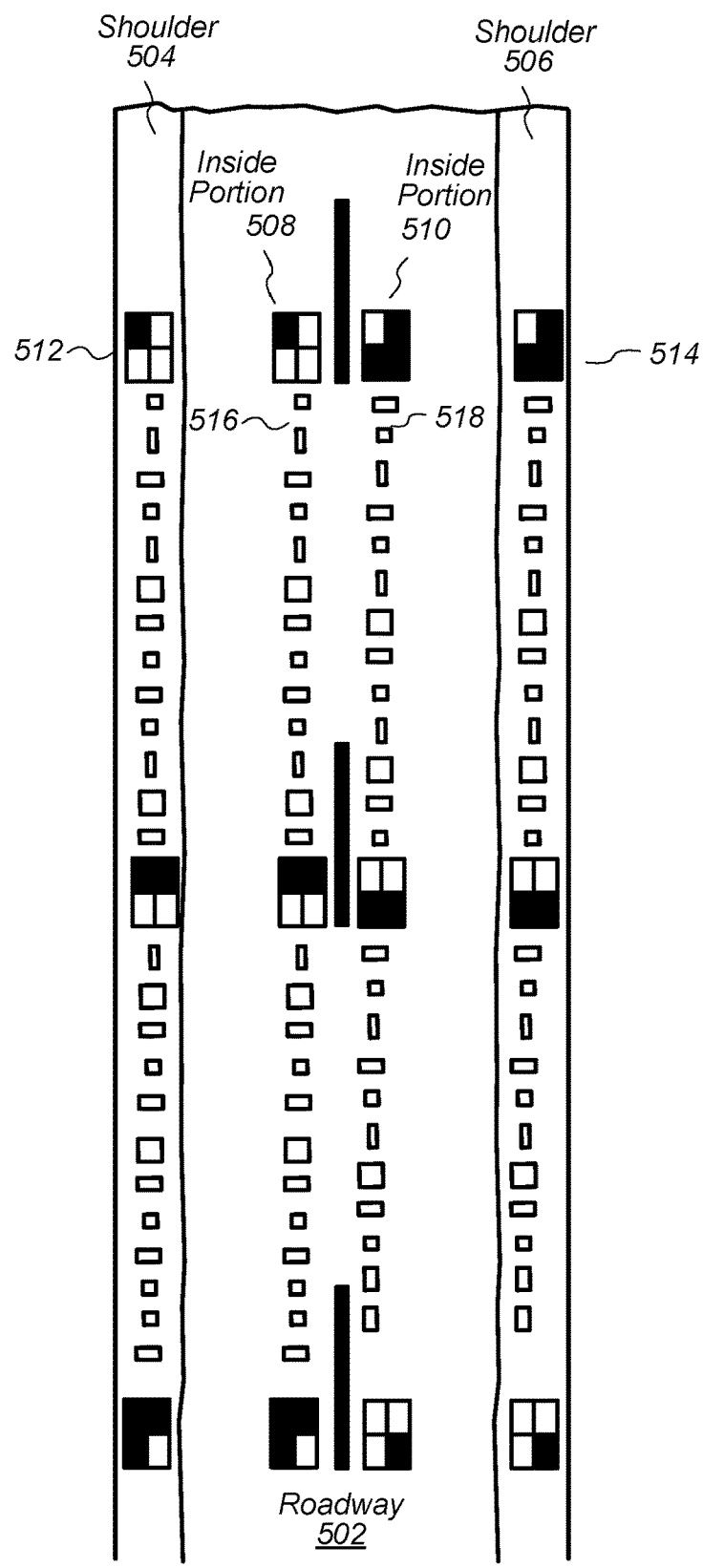
FIG. 5 illustrates an example configuration of encoded information displayed on a road surface of a roadway, according to some embodiments.

FIG. 5 illustrates an example configuration of encoded information displayed on a road surface of a roadway, according to some embodiments. In some embodiments, symbols displayed on a surface of a roadway to directly encode route information and/or location identifiers on the roadway may be redundantly displayed. For example, roadway 502 includes encoded information 518 on an inside portion of a first lane of roadway 502 and a redundant copy of the encoded information 518 (e.g. encoded information 514) on a shoulder of the first lane. Roadway 502 also includes encoded information 516 on an inside portion 508 of a second lane and redundant encoded information 512 on a shoulder of the second lane. In some embodiments, the encoded information 512, 514, 516, and/or 518, may be similar to or the same as encoded information 104 described in regard to FIGS. 1-3.

In some embodiments, various other data durability techniques may be used. For example, erasure encoding may be used, wherein some (but not all) of the symbols are redundantly displayed, wherein route information can be re-created even if not all the route information can be read from the surface of the roadway (for example due to a missing or defaced symbol). In some embodiments other data durability strategies may be used.

Figure 6:
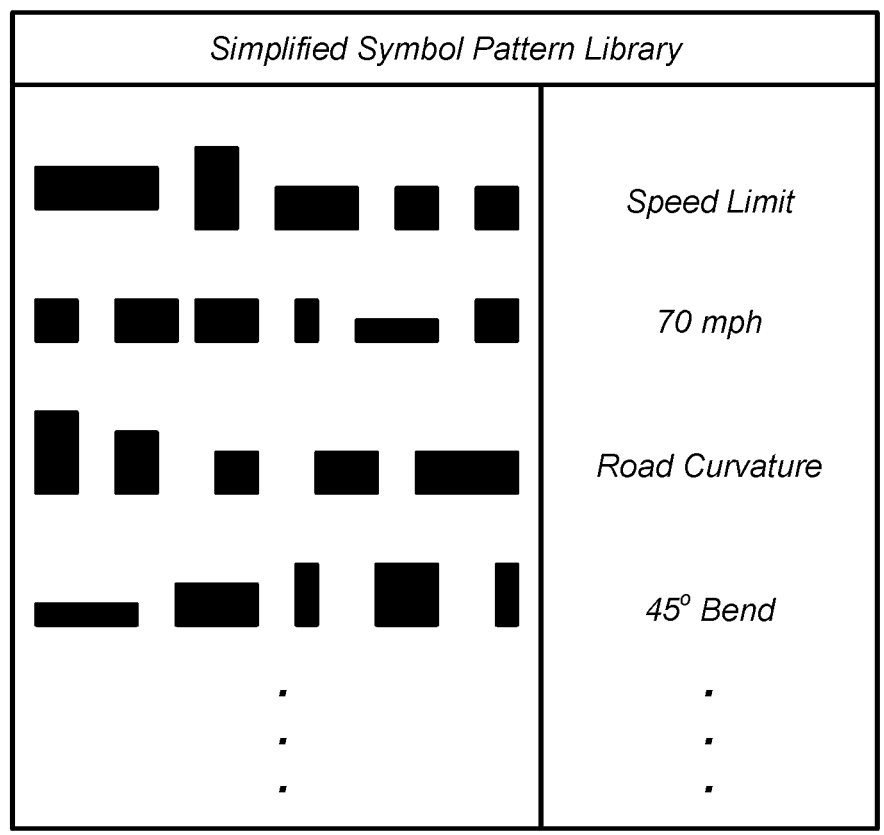
FIG. 6 illustrates a simplified version of an example symbol pattern library, according to some embodiments.

FIG. 6 illustrates a simplified version of an example symbol pattern library, according to some embodiments. As can be seen in FIG. 6, in some embodiments, combinations of symbols (or individual symbols) may be translated into data that is meaningful to a control system of a vehicle or that is meaningful when displayed to a user of a vehicle. FIG. 6 represents an example symbol library wherein combinations of symbols represent words or numbers. However, in some embodiments, various other symbol patterns or combinations may be used to communicate data. For example, in some embodiments, symbols may represent digital data (e.g. "0" or "1").

Figure 7A:
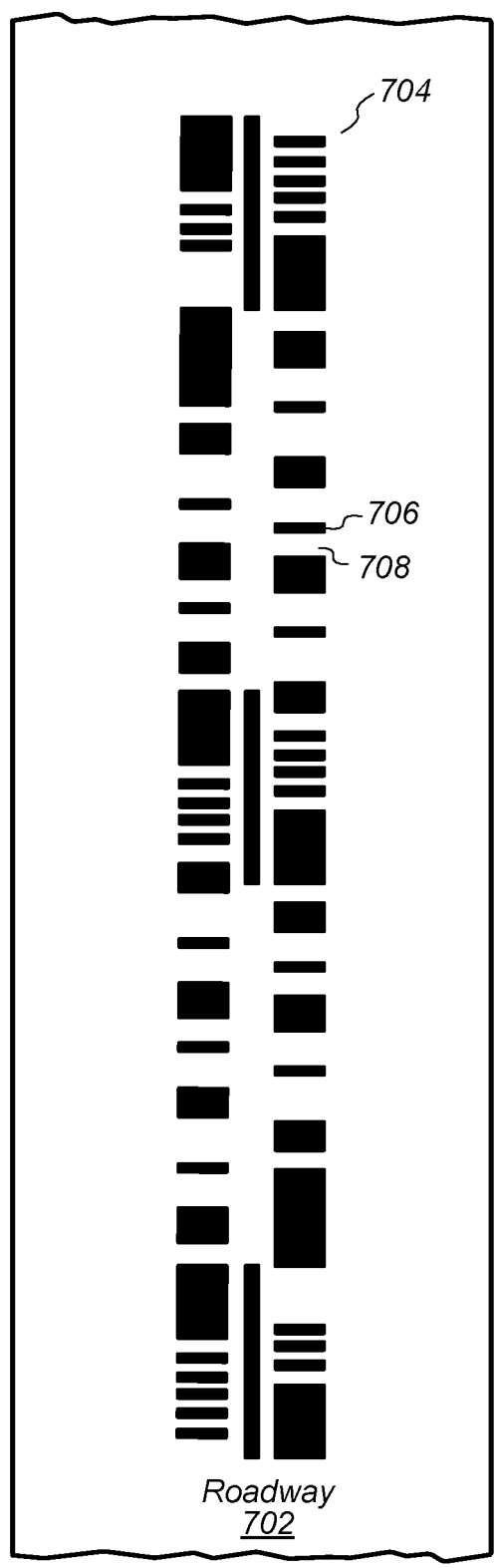
FIG. 7A illustrates an example configuration of encoded information displayed on a road surface of a roadway, according to some embodiments.

For example FIG. 7A illustrates an example configuration of encoded information displayed on a road surface of a roadway wherein the symbols represent digital data, according to some embodiments.

Roadway 702 includes symbols 704 that include stripes 706 and gaps 708. In some embodiments, a stripe may represent a first digital state, such as a "1" and a gap may represent a second digital state, such as a "0." In some embodiments, a roadway such as roadway 702 may be incremented into digital slots, wherein each X feet of the road represents a digital slot. For example, stripe 706 may occupy a single digital slot and may represent a single "1" and gap 708 may occupy two digital slots and may represent two consecutive "0's." In some embodiments, a standardized bit pattern may be used to introduce a location identifier and this bit pattern may not be used in static route information. Thus a reader of the digitally encoded route information directly encoded on a surface of a roadway may easily distinguish location identifiers from other route information. In some embodiments, the digital route information may be compressed route information, encrypted route information, etc. In some embodiments, the digital route information may include one or more authentication features.

Figure 7B:
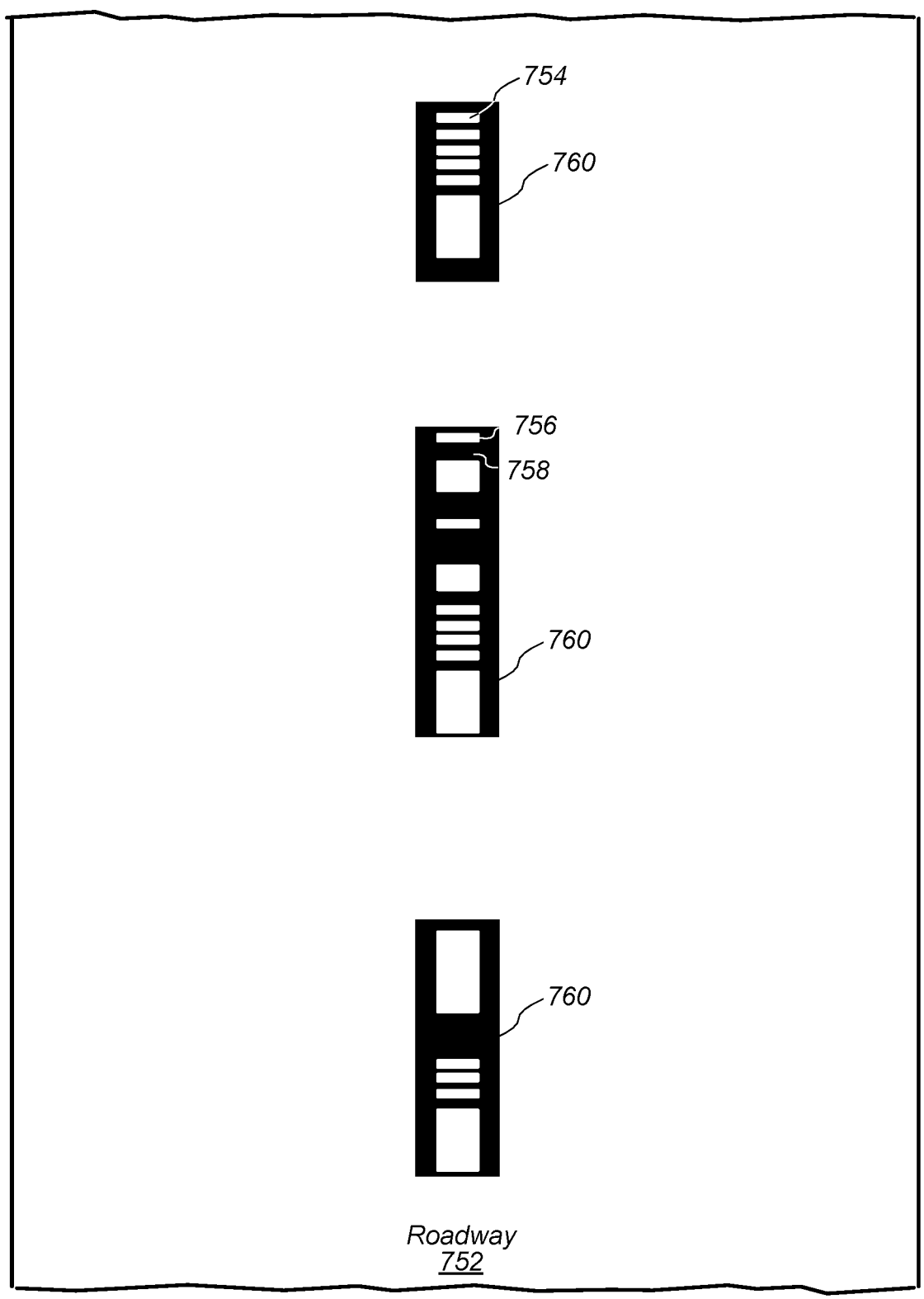
FIG. 7B illustrates an example configuration of encoded information displayed on a road surface of a roadway, according to some embodiments.

FIG. 7B illustrates an example configuration of encoded information displayed on a road surface of a roadway, according to some embodiments.

In some embodiments, symbols that encode route information and/or location identifiers directly on a surface of a roadway, may not be easily identifiable to casual passengers along the roadway. For example, the symbols may be included in existing roadway markings and may be identifiable using a camera filter that can identify the symbols, wherein the symbols are not readily perceptible by the human. Thus, many users of the road may not even realize that symbols are painted on the surface of the roadway.

For example, roadway 752 includes symbols 754 that include stripes 756 and gaps 758 painted into existing roadway markings such as a center stripe of a roadway. In some embodiments, a stripe may represent a first digital state, such as a "1" and a gap may represent a second digital state, such as a "0." In some embodiments, a roadway such as roadway 752 may be incremented into digital slots, wherein each X feet of the road represents a digital slot. For example, stripe 756 may occupy a single digital slot and may represent a single "1" and gap 758 may occupy two digital slots and may represent two consecutive "0's." In some embodiments, a standardized bit pattern may be used to introduce a location identifier and this bit pattern may not be used in static route information. Thus a reader of the digitally encoded route information directly encoded on a surface of a roadway may easily distinguish location identifiers from other route information. In some embodiments, the digital route information may be compressed route information, encrypted route information, etc. In some embodiments, the digital route information may include one or more authentication features. In some embodiments, a sensor of a vehicle, such as a camera, may include one or more filter features that distinguish stripes 756 and gaps 758 from a background marking 760. In some embodiments, any of the symbols described herein, such as in FIGS. 1-6, may be painted into existing or newly placed roadway markings as shown, or in a similar manner, as described in FIG. 7B. In some embodiments, stripes 756 and/or gaps 758 may be painted with an infrared detectable paint or other type of marking that is not readily identifiable by the human eye, but that can be detected by a properly calibrated sensor.

Figure 8A:
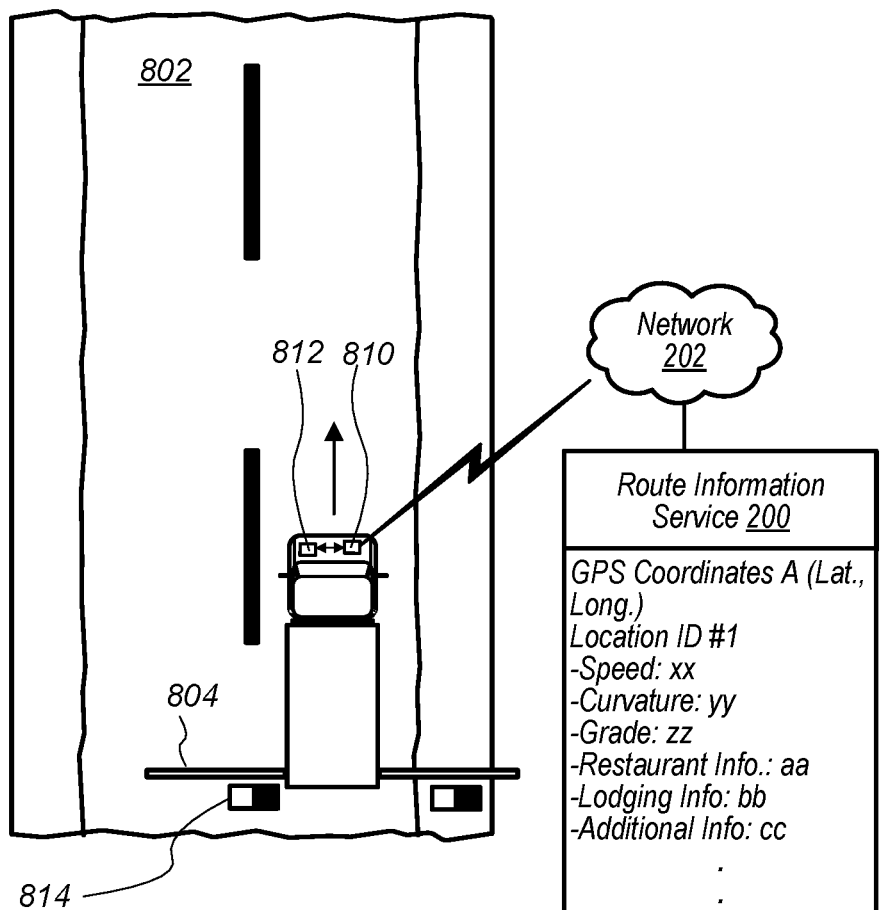
FIG. 8A illustrates a top view of a road symbol application device applying encoded information on a road surface of a roadway, according to some embodiments.
Figure 8B:
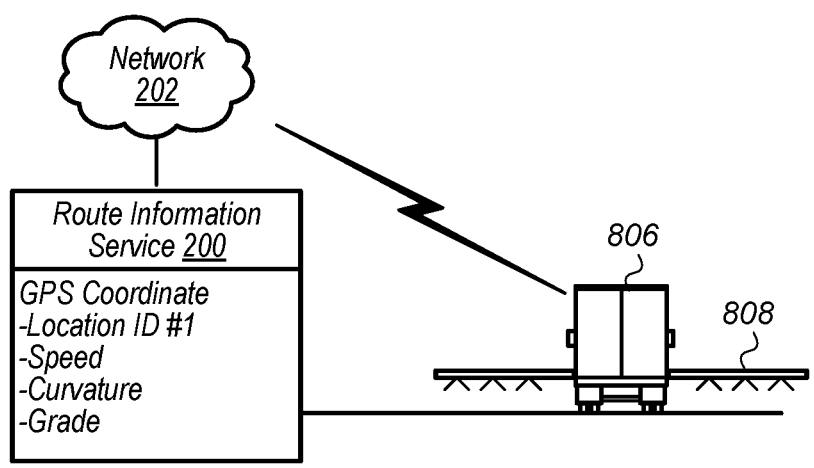
FIG. 8B illustrates a rear view of a road symbol application device applying encoded information on a road surface of a roadway, according to some embodiments.

FIG. 8A illustrates a top view of a road symbol application device applying encoded information on a road surface of a roadway, according to some embodiments. FIG. 8B illustrates a rear view of the road symbol application device applying encoded information on a road surface of a roadway, according to some embodiments.

In some embodiments, a road symbol application device 804 may be configured to mount on a vehicle, such as truck 806, or may be built into a vehicle such as truck 806. The road symbol application device includes a symbol applicator, such as symbol applicator 808. A symbol applicator 808 may be a paint spray nozzle, a sticker applicator, a heat-based symbol applicator, or various other types of devices that are configured to affix a permanently embedded material to a surface of a roadway. The road symbol application device 804 may further include one or more computing devices 810 and a GPS receiver 812.

In some embodiments, a road symbol application device, such as road symbol application device 804, may provide coordinates for a current location of the road symbol application device to a route information service via a network connection. The route information service may then determine a location ID of the current location of the road symbol application device and may provide the road symbol application device instructions for applying symbols to the surface of the roadway upon which the road symbol application device is traversing, wherein the instructions for applying the symbols encode route information associated with that section of the roadway onto a surface of the roadway.

For example, GPS receiver 812 of truck 806 may determine current coordinates for the truck 806 and one or more computing devices 810 of the road symbol application device 804 may provide the current coordinates to route information service 200. (Note that in some embodiments the one or more computing devices 810 may be incorporated into a common structure with symbol applicator 808.) The route information service may return instructions to road symbol application device 804 and the one or more computing devices 810 of the road symbol application device 804 may coordinate operation of the symbol applicator 808 to apply symbols at geographic locations indicated in the received instructions for encoding static route information.

In some embodiments, a location receiver of a vehicle that includes a road symbol application device may include one or more systems that augments a GPS system in order to increase accuracy and/or precision of the location receiver. For example, a radio system that receives radio signal from a terrestrial station may augment and/or replace a GPS system. In some embodiments, cellular signals, Wi-Fi signals, etc. may also be used to augment and/or replace a GPS module of a location receiver. In some embodiments, a location receiver may include an internal motion unit (IMU) that supplements a GPS receiver.

In some embodiments, a road symbol application device 804 may be a self-contained device that is shippable to a user. For example, in some embodiments, a user of a route information service may transmit information for a route, such as a drive on private property, and the route information service may ship the user a pre-programmed road symbol application device for encoding route information on the private drive. The user may attach the road symbol application device to a personal vehicle and self-apply symbols to the private drive. The user may then ship the road symbol application device back to the route information service.

Figure 9:
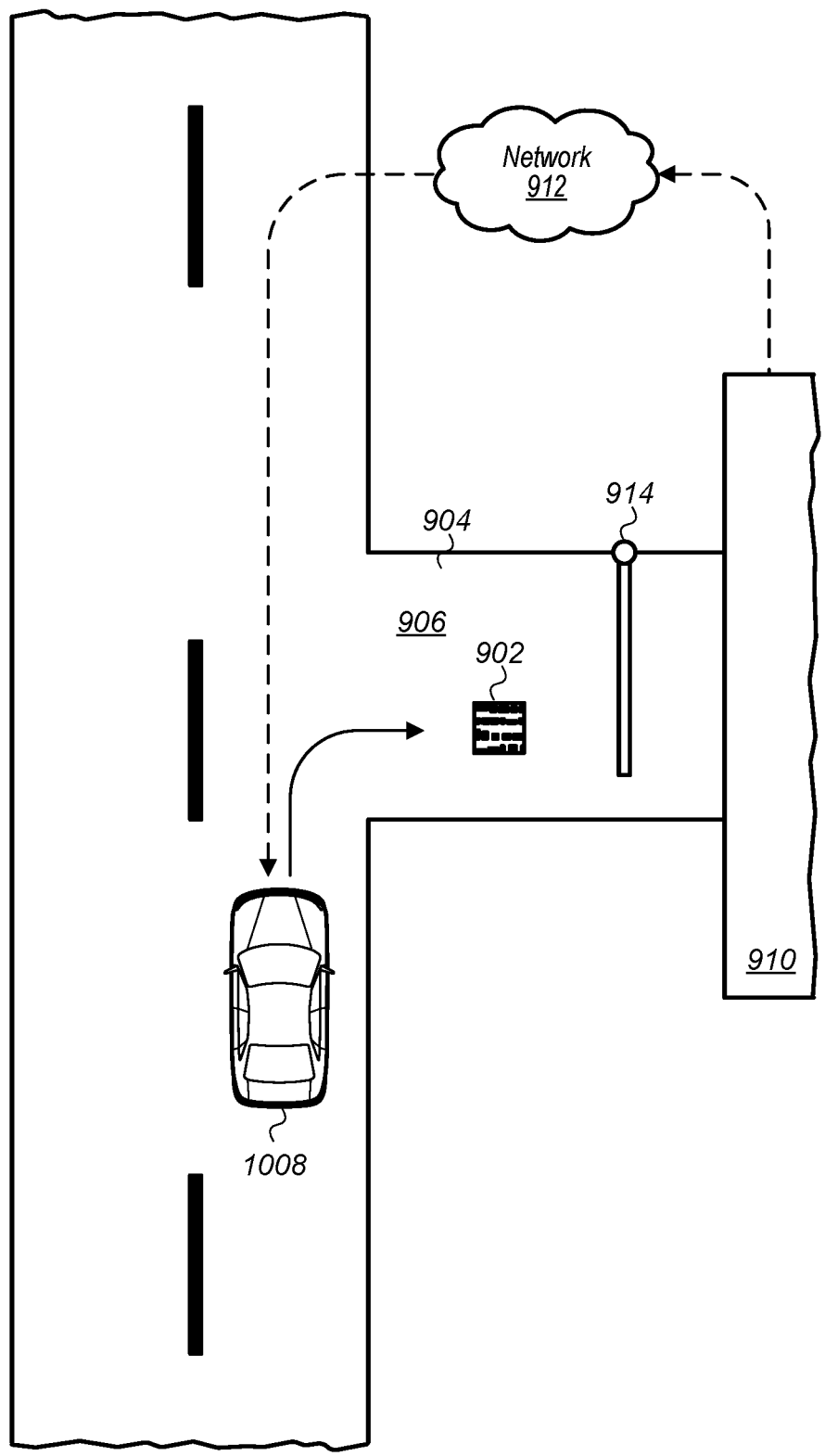
FIG. 9 illustrates a vehicle approaching encoded information displayed on a road surface of a private driveway, according to some embodiments.

FIG. 9 illustrates a vehicle approaching encoded information displayed on a road surface of a private driveway, according to some embodiments. Encoded route information 902 may have been self-applied by a user using a road symbol application device. The encoded route information 902 may be displayed on a surface 904 of private drive 906. The encoded route information 902 may include instructions for vehicle 908 to navigate to house 910 via private drive 906. In some embodiments, the encoded route information 902 may be encrypted and an owner/resident of house 910 may provide an encryption key to vehicle 908 via network 912. This may allow an on-board computer of vehicle 908 to be able to decrypt the encrypted encoded route information 902 and navigate to house 910. In some embodiments, the encoded route information may include additional instructions, such as instructions for opening gate 914.

In some embodiments, surface applied encoded route information may be applied to an overhead surface, such as a ceiling of a tunnel, bridge, or other structure. In some embodiments, surface applied encoded route information may be applied to a ceiling of a facility, such as a warehouse or data center. In some embodiments, the roadway being traversed may be an aisle of the facility and a vehicle traversing the aisle may be a robot, drone, or other autonomous device used in the warehouse or data center.

Figure 10A:
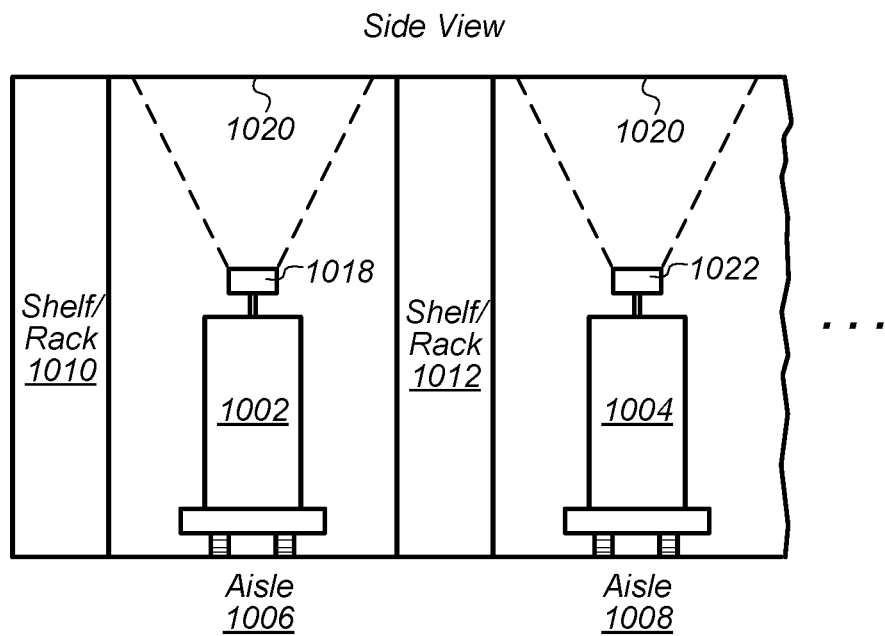
FIG. 10A illustrates a side view of a robot traversing an aisle of a facility while reading encoded information off of a ceiling of the facility, according to some embodiments.
Figure 10B:
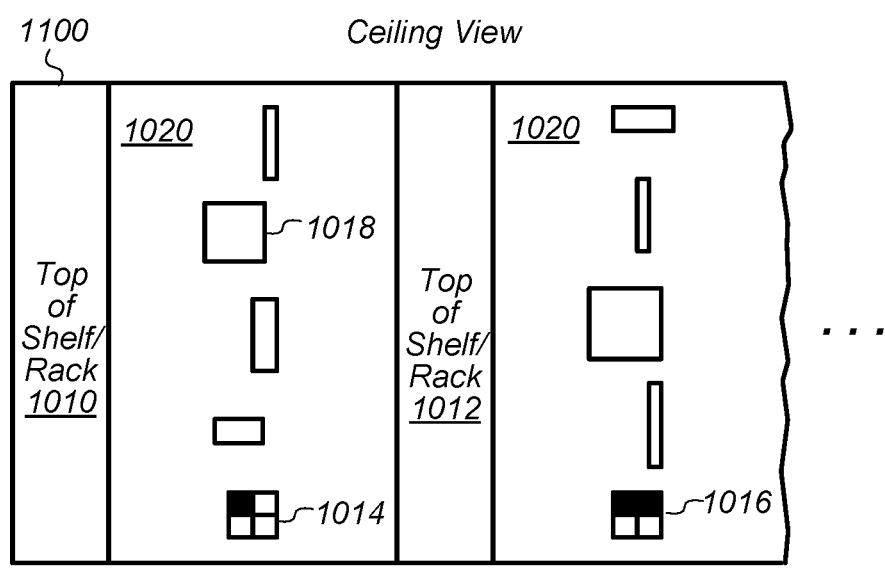
FIG. 10B illustrates a view of the ceiling of the facility that includes the encoded information displayed on a surface of the ceiling, according to some embodiments.

For example, FIG. 10A illustrates a side view of a robot traversing an aisle of a facility while reading encoded information off of a ceiling of the facility, according to some embodiments. FIG. 10B illustrates a view of the ceiling of the facility that includes the encoded information displayed on a surface of the ceiling, according to some embodiments.

Robot 1002 traverses aisle 1006 between racks or shelves 1010 and 1012 of facility 1000. Robot 1004 traverses aisle 1008. Robot 1002 includes a sensor 1018 pointed towards ceiling 1020 of facility 1000 and robot 1004 includes sensor 1022 pointed towards ceiling 1020 of facility 1000. Location identifiers 1014 and 1016 are displayed on respective ones of ceilings 1020 of aisles 1006 and 1008. Also static route information 1018 is displayed on respective ones of ceilings 1020 of aisles 1006 and 1008. In some embodiments, robot 1002 and 1004 read static route information 1018 and/or location identifiers 1014 and 1016 off of ceiling 1020 to navigate facility 1000 and/or to acquire other information related to tasks performed by robots 1002 and 1004.

Figure 11A:
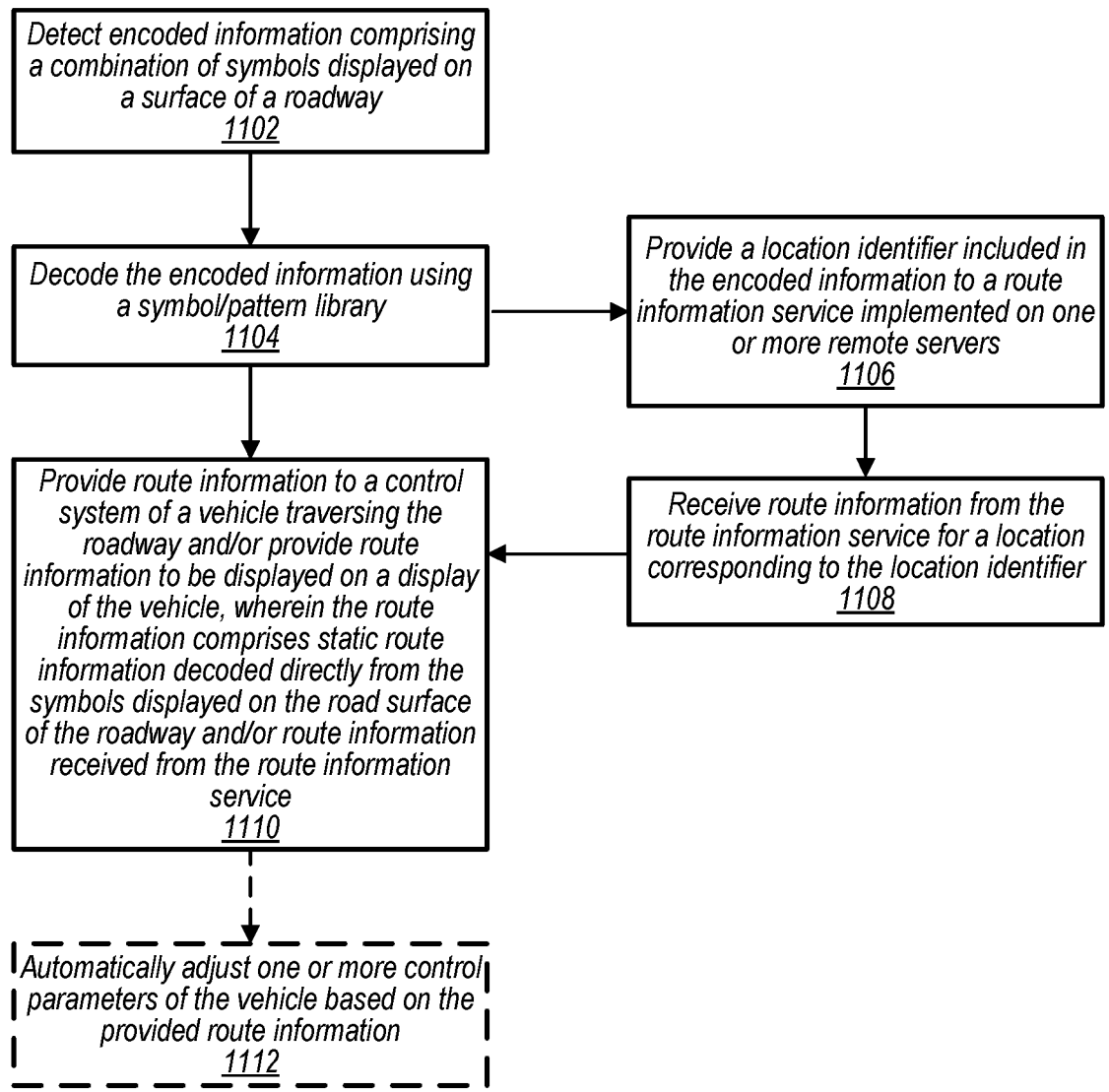
FIG. 11A illustrates a high-level flowchart for reading encoded information from a surface of a roadway and using the encoded information to control a vehicle or to adjust a display of the vehicle, according to some embodiments.

FIG. 11A illustrates a high-level flowchart for reading encoded information from a surface of a roadway and using the encoded information to control a vehicle or to adjust a display of the vehicle, according to some embodiments.

At 1102, a vehicle traversing a roadway detects encoded information comprising a combination of symbols displayed on a surface of the roadway. For example a sensor, such as a camera mounted on the vehicle detects the symbols displayed on the surface of the roadway.

At 1104, the vehicle (e.g. an on-board computing device of the vehicle) decodes the encoded information using a symbol/pattern library known to a decoder installed on the on-board computer of the vehicle. In some embodiments, the symbol patterns may include shapes having varying lengths and widths, such as different sized rectangles or squares. In some embodiments, the symbol patterns may include strips and gaps that represent digital data in respective digital slots. In some embodiments, other shape combinations may be used.

At 1106, the on-board computing device provides data indicating a location identifier encoded on the surface of the roadway to a route information service implemented on one or more remote servers and at 1108, the on-board computing device receives route information from the route information service for a location along the roadway (or section of the roadway) corresponding to the location identifier. In some situations 1106 and 1108 may be omitted, for example if a connection to the route information service is not available or if the route information service fails to respond.

At 1110, the on-board computing device of the vehicle provides route information to a control system of the vehicle or to a display of the vehicle. The route information may be static route information read from the surface of the roadway or may be additional and/or dynamic route information received from the route information service. In some embodiments, the provided route information may include both static and dynamic and/or additional route information received from the route information service.

At 1112, the control system of the vehicle may adjust one or more control parameters or take other control actions based on the route information received from the on-board computer of the vehicle. In some embodiments, 1112 may be omitted. For example route information may be displayed without being used for control, or the controller may control based on information received from another source, such as a manual override.

Figure 11B:
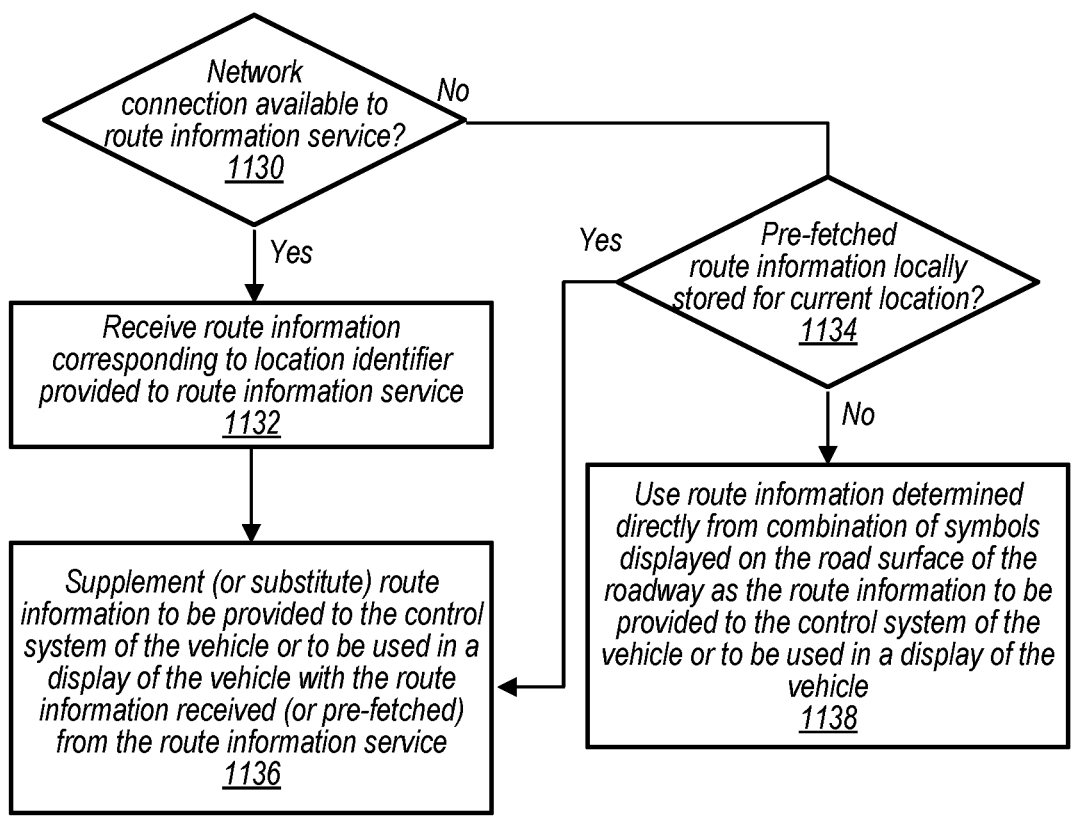
FIG. 11B illustrates a high-level flowchart for a vehicle responding to a lost network connection while reading encoded information from a surface of a roadway, according to some embodiments.

FIG. 11B illustrates a high-level flowchart for a vehicle responding to a lost network connection while reading encoded information from a surface of a roadway, according to some embodiments.

At 1130, an on-board computing device of a vehicle determines if a network connection is available to a route information service. If the network connection is available, at 1132 the on-board computing device receives route information from the route information service corresponding to a location identifier provided to the route information service.

If the network connection at 1130 is not available, the on-board computing device determines at 1134 whether any pre-fetched route information is locally stored in a cache of the on-board computing device, wherein the pre-fetched route information corresponds to a current location identifier that the on-board computing device has decoded.

At 1138, if pre-fetched route information is not stored in the cache and the network connection is not available to the route information service, the on-board computing device uses route information determined directly from combinations of symbols displayed on a surface of the roadway (e.g. static route information) as the route information to be provided to the control system of the vehicle or to be used in a display of the vehicle.

If route information is received from a route information service at 1132 or pre-fetched route information is stored in a local cache, at 1136 the on-board computing device supplements or substitutes static route information read directly from the surface of the roadway with route information stored in the cache or received from the route information service at 1132. The supplemented or substituted route information is provided to a control system of the vehicle for control or is used by a display of the vehicle.

Figure 11C:
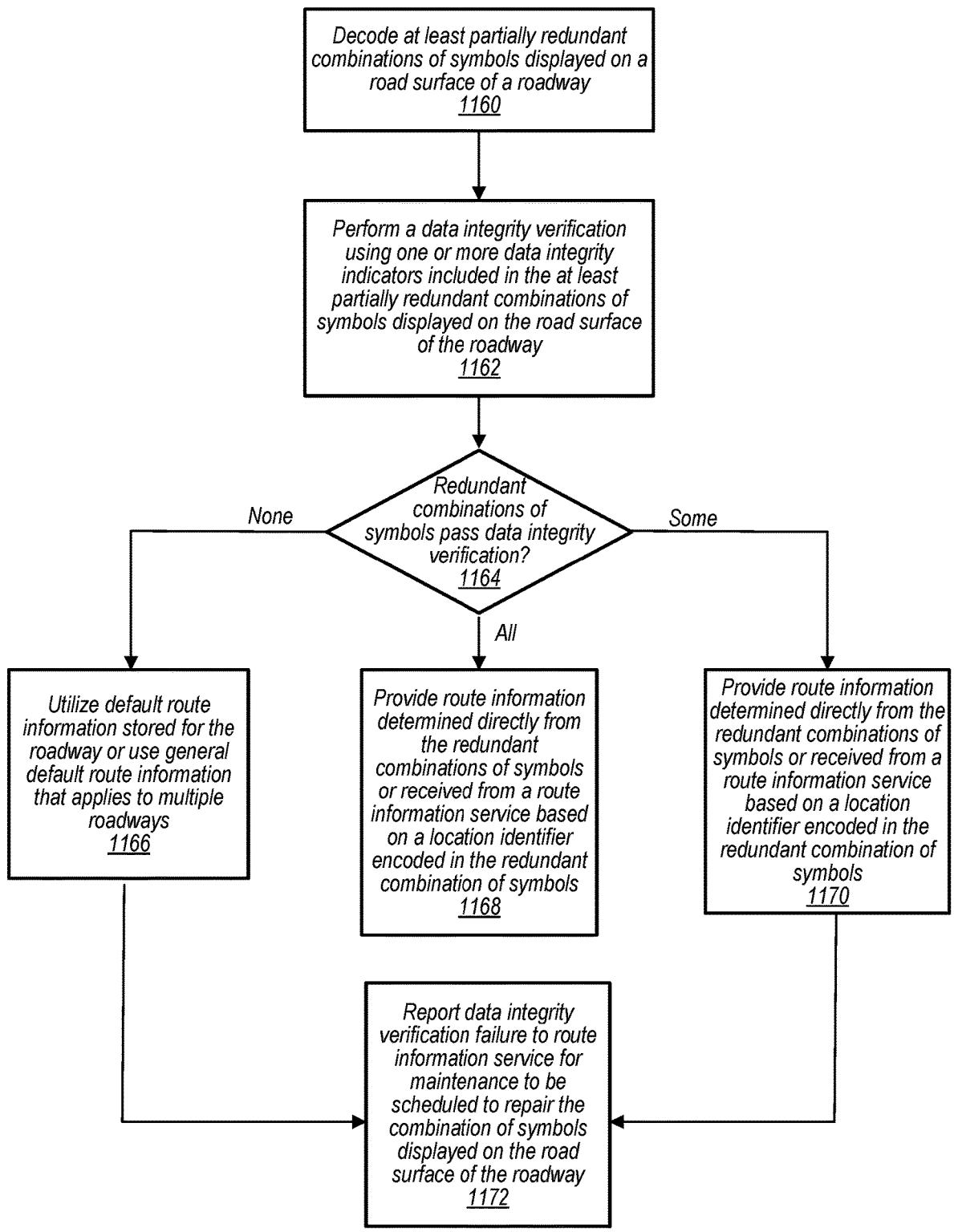
FIG. 11C illustrates a high-level flowchart for reading at least partially redundantly encoded information from a surface of a roadway and responding to data verification failures, according to some embodiments.

FIG. 11C illustrates a high-level flowchart for reading at least partially redundantly encoded information from a surface of a roadway and responding to data verification failures, according to some embodiments.

At 1160, an on-board computing device of a vehicle decodes at least partially redundantly encoded combinations of symbols displayed on a surface of a roadway.

At 1162, the on-board computing device of the vehicle performs one or more data integrity verifications/validations using data integrity indicators included in the encoded data displayed on the surface of the roadway. For example, a data integrity verification/validation may comprise calculating a checksum value and comparing the calculated checksum value to a checksum value included in the encoded information displayed on the surface of the roadway.

At 1164, it is determined whether redundant combinations of symbols displayed on the surface of the roadway passed the data integrity verification/validation. If all of the redundantly encoded data passed the data integrity verification/validation, at 1168 the on-board computing device provides route information determined directly from the redundant combinations of symbols or received from a route information service based on a location identifier encoded in the redundant combination of symbols to a control system of the vehicle or to a display of the vehicle.

If none of the encoded data passed the data integrity verification/validation, at 1166 the on-board computing device utilizes default route information stored for the roadway or general default route information to provide the route information to the control system of the vehicle. Alternatively the on-board computing device returns an error and does not provide route information to the control system of the vehicle.

If some of the encoded data passed the data integrity verification/validation, at 1170 the on-board computing device provides route information determined directly from the passing redundant combinations of symbols or received from a route information service based on a location identifier encoded in the passing redundant combination of symbols to the control system of the vehicle or to the display of the vehicle.

If some or all of the data encoded on the surface of the roadway failed the data verification/validation at 1162, the on-board computing device, at 1172 issues a data integrity verification failure report to the route information service for maintenance to be scheduled to repair the combination of symbols displayed on the road surface of the roadway that failed the data integrity verification/validation.

Figure 12:
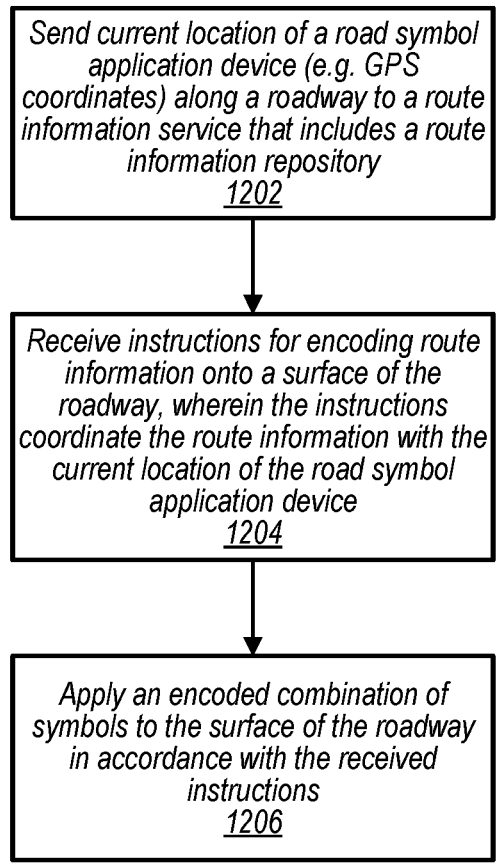
FIG. 12 illustrates a high-level flowchart for a road symbol application device applying encoded information to a road surface of a roadway, according to some embodiments.

FIG. 12 illustrates a high-level flowchart for a road symbol application device applying encoded information to a road surface of a roadway, according to some embodiments.

At 1202, a road symbol application device sends a current location of the road symbol application device to a route information service that includes a route information repository. The route information repository stores a directory of location identifiers and associated coordinates, wherein the route information service can location route information corresponding to a location identifier with similar coordinates as the coordinates received from the road symbol application device.

At 1204, the road symbol application device receives instructions for encoding route information onto a surface of the roadway, wherein the instructions coordinate the route information with the current location of the road symbol application device. For example the instructions may include instruction for which symbols to apply to the surface of the roadway in what sequence and furthermore include instructions about relative spacing between the symbols and a starting point for applying the symbols.

At 1206, the road symbol application device applies the encoded combination of symbols on the surface of the roadway in accordance with the received instructions.

Figure 13A:
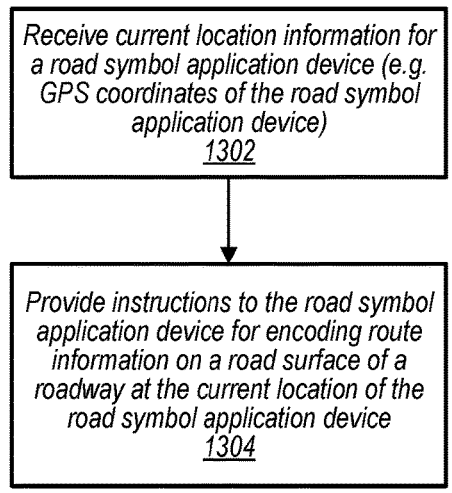
FIG. 13A illustrates a high-level flowchart for a route information service providing information to a road symbol application device to apply encoded information to a road surface of a roadway, according to some embodiments.

FIG. 13A illustrates a high-level flowchart for a route information service providing information to a road symbol application device to apply encoded information to a road surface of a roadway, according to some embodiments.

At 1302 one or more servers implementing a route information service receive current location information for a road symbol application device, such as road symbol application device 804.

At 1304, the one or more servers implementing the route information service provide instructions to the road symbol application device for encoding route information on a road surface of a roadway at the current location of the road symbol application device. For example the instructions may include instructions for applying shapes, stripes, and/or gaps on a surface of the roadway. The instructions may include a sequence for the shapes, stripes, and/or gaps and relative spacing of the shapes stripes, and/or gaps. In some embodiments, the instructions may include GPS coordinates associated with each shape, stripe, and/or gap and may allow the one or more computing devices 810 of the road symbol application device 804 to coordinate with the GPS receiver 812 to precisely control the symbol applicator 808, such that the symbol applicator 808 applies the shapes, stripes, and/or gaps at particular geographical locations along the roadway.

Figure 13B:
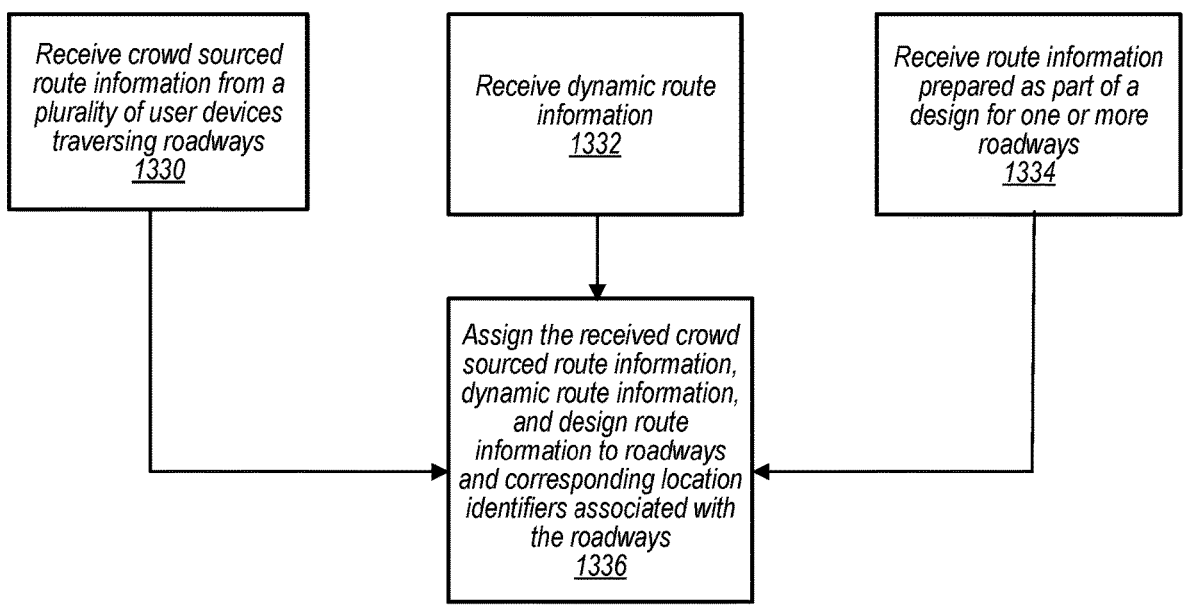
FIG. 13B illustrates a high-level flowchart for a route information service collecting and organizing route information for one or more roadways, according to some embodiments.

FIG. 13B illustrates a high-level flowchart for a route information service collecting and organizing route information for one or more roadways, according to some embodiments.

In some embodiments, one or more servers implementing a route information service receives, at 1330, crowd sourced route information from a plurality of user devices traversing roadways. Additionally or alternatively, at 1332, the one or more servers implementing the route information service receive dynamic route information or adjust dynamic route information. For example, the one or more servers may receive weather or traffic conditions and add this information to a set of route information as dynamic route information, or the one or more servers implementing the route information service may adjust existing dynamic route information. For example, the one or more servers implementing the route information service may adjust an existing dynamic speed limit based on current weather and/or traffic conditions. Additionally or alternatively, at 1334, the one or more servers implementing the route information service may receive route information prepared as part of a design process for one or more roadways.

At 1336 the one or more servers implementing the route information service organize the received route information by assigning the received crowd sourced route information, dynamic route information, and/or design route information to roadways and corresponding location identifiers associated with the roadways.

Figure 13C:
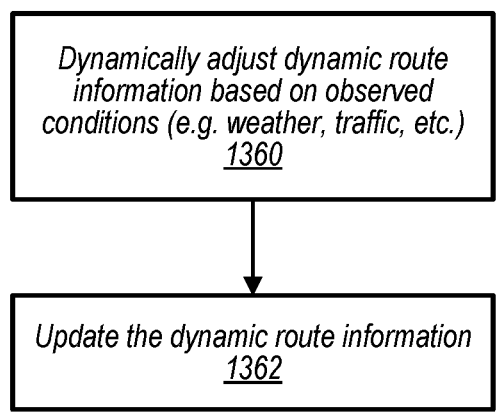
FIG. 13C illustrates a high-level flowchart for a route information service dynamically updating route information, according to some embodiments.

FIG. 13C illustrates a high-level flowchart for a route information service dynamically updating route information, according to some embodiments.

At 1360 the one or more servers implementing the route information service dynamically adjust dynamic route information based on observed conditions and at 1362 update dynamic route information associated with respected location identifiers to include the dynamically adjusted routing information adjusted at 1360.

Figure 14:
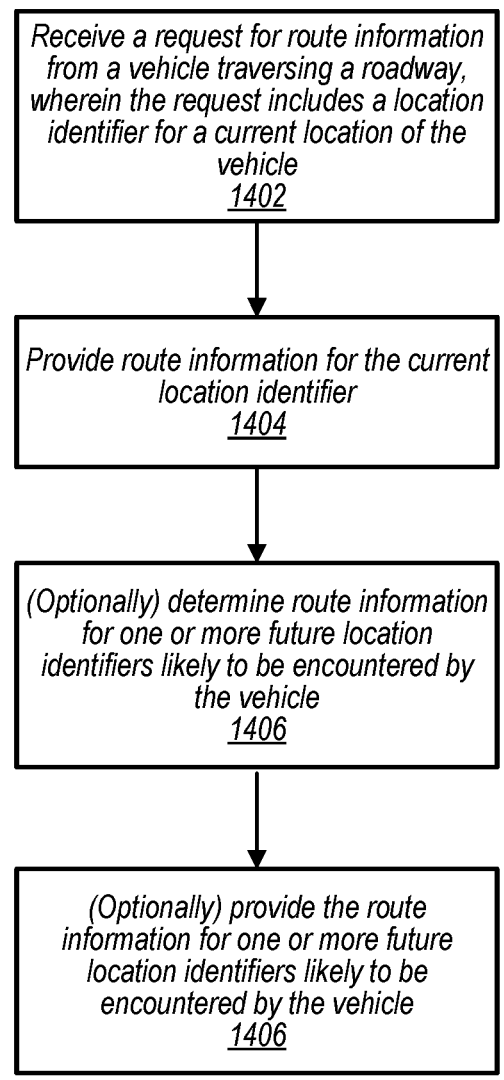
FIG. 14 illustrates a high-level flowchart for a route information service providing route information to a vehicle traversing a roadway, according to some embodiments.

FIG. 14 illustrates a high-level flowchart for a route information service providing route information to a vehicle traversing a roadway, according to some embodiments.

At 1402, the one or more servers implementing the route information service receive a request from a vehicle traversing a roadway, wherein the request includes a location identifier for a current location of the vehicle.

At 1404, the one or more servers implementing the route information service provide route information for the current location identifier to the vehicle. For example the route information for the current location identifier may be stored in a route information repository of the route information service and the route information service may locate the route information in the route information repository based on the received current location identifier.

At 1406, the one or more servers implementing the route information service may further determine route information for one or more future location identifiers likely to be encountered by the vehicle. For example, the one or more servers implementing the route information service may determine a speed and direction of the vehicle to determine likely location identifiers the vehicle will encounter in the future.

At 1408, the one or more servers implementing the route information service provide the (pre-fetched) route information for the one or more future location identifiers likely to be encountered by the vehicle.

Example Computer System

Figure 15:
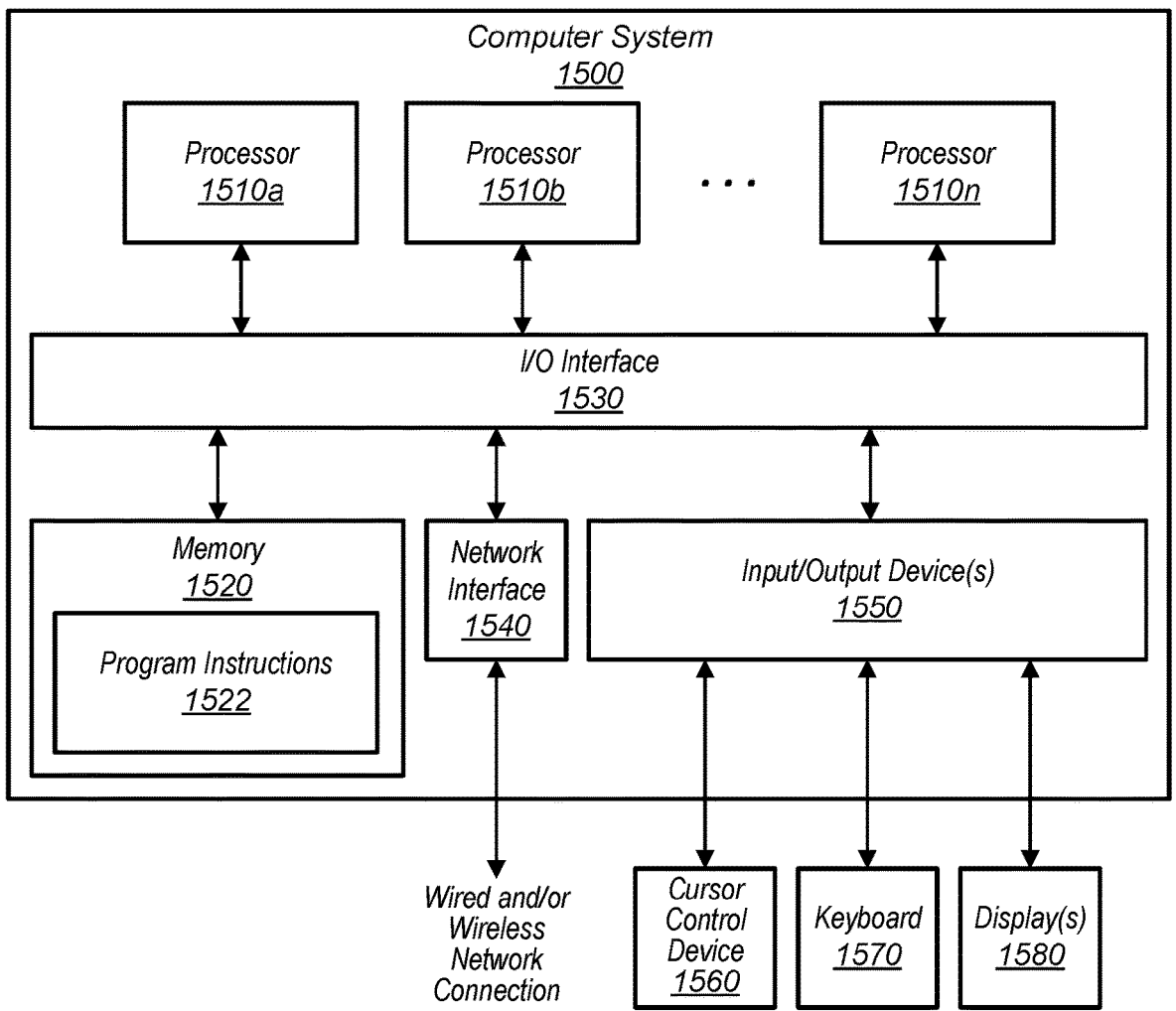
FIG. 15 illustrates an example computer system that may implement a route information service, a vehicle on-board computing system, a vehicle controller, and/or a road symbol application device controller, according to some embodiments.

FIG. 15 illustrates an example computer system that may implement a route information service, a vehicle on-board computing system, a vehicle controller, and/or a road symbol application device controller, according to some embodiments.

FIG. 15 illustrates an example computer system 1500 that may implement a route information service, vehicle on-board computing system, vehicle controller, a road symbol application device controller, or any other ones of the components described herein, (e.g., any of the components described above with reference to FIGS. 1-14), in accordance with some embodiments. The computer system 1500 may be configured to execute any or all of the embodiments described above. In different embodiments, computer system 1500 may be any of various types of devices, including, but not limited to, a personal computer system, desktop computer, laptop, notebook, mainframe computer system, network computer, a programmable logic controller PLC, or in general any type of computing or electronic device.

Various embodiments of a route information service, vehicle on-board computing system, vehicle controller, a road symbol application device controller, etc. as described herein may be executed in one or more computer systems 1500, which may interact with various other devices. Note that any component, action, or functionality described above with respect to FIGS. 1-14 may be implemented on one or more computers configured as computer system 1500 of FIG. 15, according to various embodiments. In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some cases, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store program instructions 1522 accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions 1522 may be configured to implement a route information service, vehicle on-board computing system, vehicle controller, a road symbol application device controller, having any of the functionality described above. In some embodiments, program instructions and/or data may be received, sent or stored upon different types of computer-accessible media or on similar media separate from system memory 1520 or computer system 1500. While computer system 1500 is described as implementing the functionality of functional blocks of previous Figures, any of the functionality described herein may be implemented via such a computer system.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network (e.g., carrier or agent devices) or between nodes of computer system 1500. The network may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or accessing data by one or more computer systems 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1522, which may be processor-executable to implement any element or action described above. In one embodiment, the program instructions may implement the methods described above. In other embodiments, different elements and data may be included. Note that data may include any data or information described above.

Those skilled in the art will appreciate that computer system 1500 is merely illustrative and is not intended to limit the scope of embodiments. In particular, the computer system and devices may include any combination of hardware or software that can perform the indicated functions, including computers, network devices, etc. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a sensor configured to mount on a vehicle and detect encoded information displayed on a road surface of a roadway as the vehicle travels along the roadway, wherein the encoded information is encoded via a combination of symbols displayed on the road surface of the roadway, and wherein the encoded information comprises redundantly encoded information or one or more data integrity indicators; and
   one or more computing devices configured to:
      decode the encoded information comprising the combination of symbols detected by the sensor as the vehicle travels along the roadway;
      perform a data integrity verification using the one or more data integrity indicators or the redundantly encoded information; and
      provide, in response to the data integrity verification, route information, determined based on the decoded information, to a control system of the vehicle or to a user of the vehicle.

2. The system of claim 1, further comprising the control system of the vehicle, wherein the vehicle is an autonomous vehicle, and wherein the control system is configured to:
   automatically adjust one or more control parameters of the vehicle based on the provided route information decoded from the encoded information displayed on the road surface of the roadway.

3. The system of claim 1, wherein at least some of the symbols displayed on the roadway encode a location identifier for a geographical location along the roadway, wherein one or more remote servers store route information associated with the location identifier, and
   wherein the one or more computing devices are further configured to:
      provide the location identifier to the one or more remote servers; and
      receive at least some of the route information from the remote servers.

4. The system of claim 3, wherein:
   during periods when a network connection to the one or more remote servers is available, the route information provided to the control system or to the user comprises the at least some route information received from the one or more remote servers; and
   during periods when a network connection is not available to the one or more remote servers, the route information provided to the control system or the user comprises data decoded directly from the combination of symbols displayed on the roadway.

5. The system of claim 1,
   wherein the one or more computing devices are configured to:
      report a data integrity verification failure to one or more remote servers for maintenance to be performed on the encoded information displayed on the road surface of the roadway.

6. A system comprising:
a road symbol application device comprising:
one or more computing devices configured to:
send a current location along a roadway of the road symbol application device to one or more remote servers that implement a route information repository; and
receive, from the one or more remote servers, route information associated with the current location of the road symbol application device; and
a symbol applicator configured to:
apply an encoded combination of symbols to a surface of the roadway at the current location based on the route information associated with the current location received from the one or more remote servers that implement the route information repository, wherein the encoded combination comprises redundantly encoded information or one or more data integrity indicators to enable data integrity verification.

7. The system of claim 6, wherein the road symbol application device further includes a global positioning system (GPS) receiver,
wherein the one or more computing devices of the road symbol application device are configured to:
determine the current location of the road symbol application device based on data received from the GPS receiver; and
control the symbol applicator such that the encoded combination of symbols is applied to the road surface of the roadway at geographic locations indicated in the received route information.

8. The system of claim 6, wherein the encoded combination of symbols applied on the road surface comprises block symbols having varying lengths and widths.

9. The system of claim 6, wherein the encoded combination of symbols applied on the road surface comprises strips and gaps, wherein a strip represents a first digital state and a gap between strips represents a second digital state.

10. The system of claim 6, wherein the encoded combination of symbols applied on the road surface comprises one or more symbols indicating a location identifier for a geographical location along the roadway and one or more symbols indicating static route information associated with the geographical location.

11. The system of claim 10, wherein the one or more symbols indicating a location identifier for a geographic location comprise:
a combination of blocks, wherein the combination of blocks differs from other combinations of blocks used to indicate static route information; or
a bit combination represented by strips and gaps that differs other bit combinations used to indicate static route information.

12. The system of claim 6, wherein sequential location identifiers along the roadway include unique identifiers organized according to an ordered structure known to decoders that traverse the roadway.

13. The system of claim 6, wherein the data integrity indicator comprises:
a checksum; or
a data signature.

14. The system of claim 6, wherein the encoded combination of symbols comprises encrypted data.

15. The system of claim 6, wherein the encoded combination of symbols is encoded using a hash chain.

16. A method comprising:
receiving, by a route information service, a current location along a roadway of a road symbol application device, wherein the roadway is to be encoded by the road symbol application device using combinations of encoded symbols applied to a surface of the roadway by the road symbol application device, wherein the combinations comprise redundantly encoded information or one or more data integrity indicators to enable data integrity verification; and
providing the road symbol application device instructions for applying route information associated with the current location of the road symbol application device.

17. The method of claim 16, further comprising:
receiving road information for the roadway from a plurality of devices connected to the route information service via a network;
assigning the received road information to respective geographic locations along the roadway, wherein each geographic location has an associated location identifier; and
determining the route information instructions provided to the road symbol application device based on the assigned received road information for the current location of the road symbol application device.

18. The method of claim 16, further comprising:
receiving a request for dynamic route information from a vehicle traversing the roadway, wherein the request includes a location identifier for a current location of the vehicle along the roadway; and
providing dynamic route information for the current location of the vehicle along the roadway.

19. The method of claim 18, further comprising:
dynamically adjusting the dynamic route information based at least in part on weather conditions or traffic conditions at the current location of the vehicle along the roadway.

20. The method of claim 16, further comprising: receiving, by the location and route information service, a location identifier of a vehicle traversing the roadway;
determining one or more future location identifiers for future locations of the vehicle along the roadway; and
providing the vehicle route information associated with the location identifier and route information associated with the determined future location identifiers.

* * * * *